United States Patent
Lee et al.

(10) Patent No.: US 11,363,550 B2
(45) Date of Patent: Jun. 14, 2022

(54) WIRELESS COMMUNICATION DEVICE FOR DETECTING SYNCHRONIZATION SIGNAL AND METHOD OF SEARCHING FOR SYNCHRONIZATION SIGNAL BY USING THE SAME

(71) Applicant: Samsung Electronics Co., Ltd., Suwon-si (KR)

(72) Inventors: Haechul Lee, Suwon-si (KR); Dahae Chong, Suwon-si (KR); Sungyoon Cho, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 284 days.

(21) Appl. No.: 16/576,096

(22) Filed: Sep. 19, 2019

(65) Prior Publication Data

US 2020/0169974 A1 May 28, 2020

(30) Foreign Application Priority Data

Nov. 28, 2018 (KR) .................. 10-2018-0150087
Apr. 19, 2019 (KR) .................. 10-2019-0046087

(51) Int. Cl.
*H04W 56/00* (2009.01)
*H04W 24/08* (2009.01)
*H04L 67/12* (2022.01)

(52) U.S. Cl.
CPC ......... *H04W 56/001* (2013.01); *H04W 24/08* (2013.01); *H04L 67/12* (2013.01)

(58) Field of Classification Search
None
See application file for complete search history.

(56) References Cited

U.S. PATENT DOCUMENTS

2003/0031162 A1* 2/2003 Chitrapu .............. H04B 1/7083
370/350
2011/0058528 A1* 3/2011 Chang ................. H04L 27/2662
370/330

(Continued)

FOREIGN PATENT DOCUMENTS

JP        2018-041994 A    3/2018
KR   10-2018-0089906 A    8/2018

*Primary Examiner* — Obaidul Huq
(74) *Attorney, Agent, or Firm* — Harness, Dickey & Pierce, PLLC

(57) ABSTRACT

A wireless communication device including processing circuitry configured to generate first synchronization signal measurement values by combining sets of correlation values, the sets of correlation values being based on a reception signal, and each of the sets of correlation values having a number of correlation values equal to a first accumulation count, determine whether a valid synchronization signal measurement value is detected among the first synchronization signal measurement values based on a criterion, determine a frequency corresponding to the first valid synchronization signal measurement value as a synchronization frequency in response to determining the valid synchronization signal measurement value is detected, determine a second accumulation count in response to determining the valid synchronization signal measurement value is not detected, generate second synchronization signal measurement values based on the second accumulation count, and perform an initial access operation for synchronization with a base station using the synchronization frequency.

20 Claims, 17 Drawing Sheets

(56) References Cited

U.S. PATENT DOCUMENTS

| | | | |
|---|---|---|---|
| 2014/0314128 A1* | 10/2014 | Li | H04B 1/709 |
| | | | 375/150 |
| 2015/0092572 A1* | 4/2015 | Eskelinen | H04W 56/0035 |
| | | | 370/252 |
| 2017/0034798 A1 | 2/2017 | Lin et al. | |
| 2017/0135052 A1 | 5/2017 | Lei et al. | |
| 2017/0373907 A1 | 12/2017 | Tan et al. | |
| 2018/0041978 A1* | 2/2018 | Chang | H04W 56/004 |
| 2018/0145861 A1* | 5/2018 | Lee | H04L 27/26132 |
| 2018/0184390 A1 | 6/2018 | Wu et al. | |
| 2018/0205512 A1 | 7/2018 | You et al. | |
| 2018/0287844 A1* | 10/2018 | Kim | H04L 5/005 |
| 2018/0332551 A1* | 11/2018 | Liu | H04W 56/0005 |
| 2018/0359790 A1* | 12/2018 | Ingale | H04W 28/16 |
| 2019/0103931 A1 | 4/2019 | Yi et al. | |
| 2021/0014100 A1* | 1/2021 | Lee | H04L 27/2675 |

* cited by examiner

FIG. 7

| Acc_list1 |
|:---:|
| 1 |
| 2 |
| 4 |
| 8 |
| 16 |

| Acc_list2 |
|:---:|
| 1 |
| 2 |
| 3 |
| 4 |
| 5 |

WIRELESS COMMUNICATION DEVICE FOR DETECTING SYNCHRONIZATION SIGNAL AND METHOD OF SEARCHING FOR SYNCHRONIZATION SIGNAL BY USING THE SAME

CROSS-REFERENCE TO RELATED APPLICATIONS

This application claims the benefit of Korean Patent Application No. 10-2018-0150087, filed on Nov. 28, 2018, and Korean Patent Application No. 10-2019-0046087, filed on Apr. 19, 2019, in the Korean Intellectual Property Office, the disclosures of which are incorporated herein in their entirety by reference.

BACKGROUND

The inventive concepts relate to a wireless communication device and a method of searching for a synchronization signal thereby, and more particularly, to a wireless communication device for detecting a synchronization signal and a method of searching for a synchronization signal thereby.

In wireless communication systems, synchronization signals are used for cell search operations performed by user equipment or for synchronization thereof. In mobile communication systems such as long term evolution (LTE) or 5-th generation (5G) mobile communication systems, user equipment may search for cells formed by base stations by detecting synchronization signals that are broadcast from the base stations.

Recently, due to the development of Internet of Things (IoT), various communication systems for IoT have attracted the attention. For example, a narrowband-Internet of Things (NB-IoT) may support wide area services by using narrow bands in LTE networks involving weak electric field operations. Therefore, implementing efficient cell search operations in a low signal-to-noise ratio (SNR) range would be desirable.

SUMMARY

The inventive concepts provide a wireless communication device for efficiently detecting a synchronization signal by adaptively changing an accumulation count and also provides a method of searching for a frequency by using the wireless communication device.

According to an aspect of the inventive concepts, there is provided a wireless communication device including processing circuitry configured to generate each first synchronization signal measurement value among a plurality of first synchronization signal measurement values by combining a different set of first correlation values among a plurality of sets of first correlation values, each of the plurality of first synchronization signal measurement values corresponding to a different frequency among a plurality of frequencies, the plurality of sets of first correlation values being based on a reception signal having the plurality of frequencies, each of the plurality of sets of first correlation values having a number of first correlation values equal to a first accumulation count, determine whether a first valid synchronization signal measurement value is detected among the plurality of first synchronization signal measurement values based on a criterion, determine a frequency among the plurality of frequencies corresponding to the first valid synchronization signal measurement value as a first synchronization frequency in response to determining the first valid synchronization signal measurement value is detected, determine a second accumulation count in response to determining the first valid synchronization signal measurement value is not detected, generate a plurality of second synchronization signal measurement values based on the second accumulation count, and perform an initial access operation for synchronization with a base station using the first synchronization frequency.

According to an aspect of the inventive concepts, there is provided a method of searching for a synchronization signal, the method including generating each first synchronization signal measurement value among a plurality of first synchronization signal measurement values by combining a different set of first correlation values among a plurality of sets of first correlation values, each of the plurality of first synchronization signal measurement values corresponding to a different frequency among a plurality of frequencies, the plurality of sets of first correlation values being based on N reception signals where N is a natural number, each of the plurality of sets of first correlation values having N first correlation values, each of the plurality of sets of first correlation values corresponding to a different frequency among the plurality of frequencies of the N reception signals, determining whether a first valid synchronization signal measurement value is detected among the plurality of first synchronization signal measurement values based on a criterion, generating each second synchronization signal measurement value among a plurality of second synchronization signal measurement values by combining a different set of second correlation values among a plurality of sets of second correlation values in response to determining the first valid synchronization signal measurement value is not detected, the plurality of sets of second correlation values being based on M reception signals where M is a natural number different from N, each of the plurality of sets of second correlation values having M first correlation values; and performing synchronization with a base station using a first synchronization frequency among the plurality of frequencies corresponding to the first valid synchronization signal measurement value in response to determining the first valid synchronization signal measurement value is detected.

According to an aspect of the inventive concepts, there is provided a method of searching for a synchronization signal, the method including generating each synchronization signal measurement value among a plurality of synchronization signal measurement values by combining a different set of correlation values among a plurality of sets of correlation values, each of the plurality of synchronization signal measurement values corresponding to a different frequency among a plurality of frequencies, the plurality of sets of correlation values being based on N reception signals where N is a natural number, each of the plurality of sets of correlation values having N correlation values, each of the plurality of sets of correlation values corresponding to a different frequency among the plurality of frequencies of the N reception signals, determining a frequency among the plurality of frequencies corresponding to a valid synchronization signal measurement value among the plurality of synchronization signal measurement values as a synchronization frequency, the valid synchronization signal measurement value being detected among the plurality of synchronization signal measurement values based on a criterion, accumulating received plurality of synchronization signals corresponding to the synchronization frequency based on a number of the N reception signals to generate an accumulated synchronization signal, determining whether synchronization data included in the accumulated synchronization signal is valid based on reference data, and performing synchronization with a base station using a management information signal received from the base station in response to determining the synchronization data is valid.

BRIEF DESCRIPTION OF THE DRAWINGS

Embodiments of the inventive concepts will be more clearly understood from the following detailed description taken in conjunction with the accompanying drawings in which:

FIG. 7 illustrates tables each illustrating an accumulation count list, according to an example embodiment of the inventive concepts;

DETAILED DESCRIPTION

Hereinafter, embodiments of the inventive concepts will be described in detail with reference to the accompanying drawings.

Figure 1:
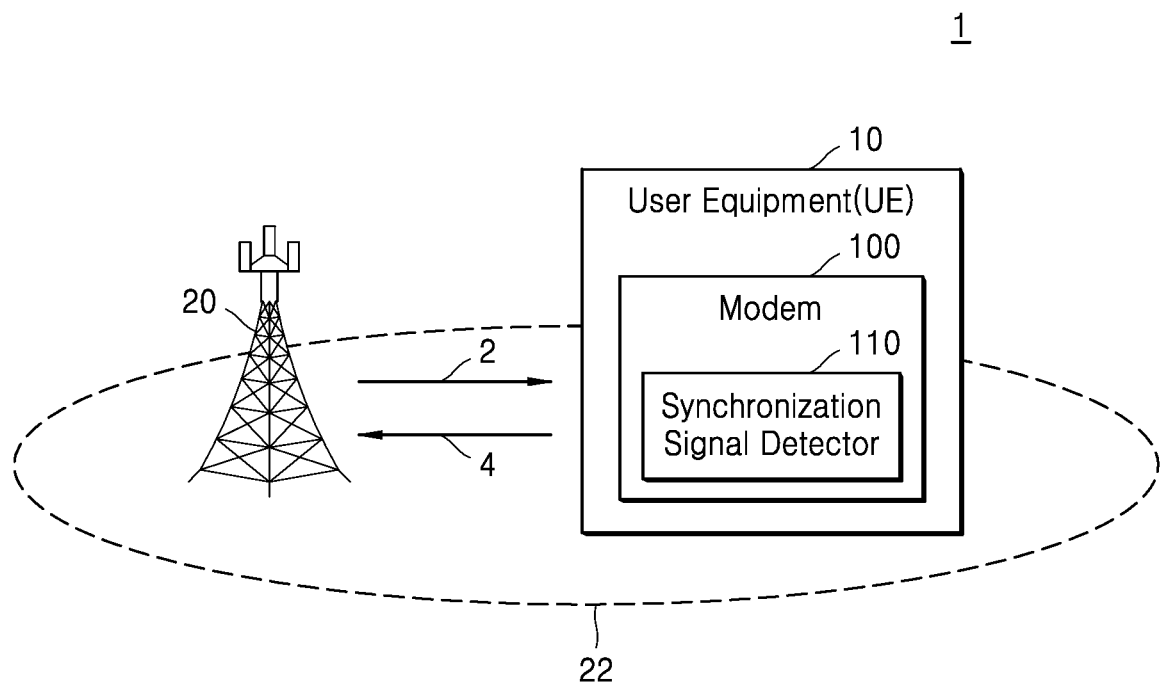
FIG. 1 illustrates a block diagram of a wireless communication system according to an example embodiment of the inventive concepts.

FIG. 1 illustrates a block diagram of a wireless communication system according to an example embodiment of the inventive concepts.

Referring to FIG. 1, a wireless communication system 1 may include user equipment 10 and/or a base station 20.

The base station 20 may wirelessly communicate with the user equipment 10 via one or more base station antennas. For example, the base station 20 may communicate with the user equipment 10 via a downlink (DL) channel 2 and/or an uplink (UL) channel 4. A wireless communication network between the base station 20 and the user equipment 10 may support communication between a large number of users by sharing available network resources. For example, in the wireless communication network, information may be transferred in various manners such as code division multiple access (CDMA), frequency division multiple access (FDMA), time division multiple access (TDMA), orthogonal frequency division multiple access (OFDMA), single carrier frequency division multiple access (SC-FDMA), and/or the like.

Although one base station 20 is illustrated in FIG. 1, this is merely for descriptive convenience, and the communication system 1 may include more than one base station 20. In addition, the wireless communication system 1 may include different types of base stations (for example, macro, micro and/or pico base stations).

The base station 20 may provide a cell 22 as communication coverage for a certain geographic area. In other words, the cell 22 may be a wireless communication service coverage area provided by the base station 20. The user equipment 10 may search for the cell 22, of which the base station 20 takes charge (e.g., provides), and be connected thereto, thereby communicating with the base station 20. For example, the user equipment 10 may perform a cell search including sensing an appropriate cell (e.g., the cell 22), searching the corresponding cell for a synchronization frequency for use in performing synchronization, and performing a synchronization operation in which a symbol and/or a frame timing are obtained based on the synchronization frequency found by searching the corresponding cell. As used herein, the term "synchronization frequency" may refer to a center frequency used for signal transmission and/or reception with respect to a base station, and/or may refer to a channel number (for example, E-UTRAN Absolute Radio-Frequency Channel Number (EARFCN)) corresponding thereto.

In some examples, the base station 20 may be referred to as a base transceiver station (BTS), a radio base station, an access point (AP), a radio transceiver, a NodeB, an eNodeB (eNB), a Home NodeB, a Home eNodeB, and/or another appropriate term, without being limited thereto.

The base station 20 may broadcast a synchronization signal for cell search of the user equipment 10 (e.g., for use by the user equipment 10 in performing a cell search operation). For example, the base station 20 may transmit, as a synchronization signal, a narrow primary synchronization signal (NPSS) and/or a narrow secondary synchronization signal (NSSS). Specifically, the base station 20 may transmit a synchronization signal including a plurality of frames, and each of the plurality of frames may include a plurality of sub-frames. The base station 20 may map, on a per-frame basis, a first synchronization signal (for example, an NPSS)

to one or more sub-frames of each frame. In addition, the base station 20 may map, on a frame basis, a second synchronization signal (for example, an NSSS) to a different sub-frame from the sub-frames to which the first synchronization signal is mapped in each frame.

The user equipment 10 may refer to a wireless communication device including various devices which are stationary or mobile and capable of transmitting and/or receiving, data and/or control information, by communicating with the base station 20. For example, the user equipment 10 may be referred to as terminal equipment, a mobile station (MS), a mobile terminal (MT), a user terminal (UT), a subscriber station (SS), a wireless device, a handheld device, and/or the like.

The user equipment 10 may include a modem 100. The modem 100 may be configured to perform various functions related to a wireless interface between the base station 20 and the user equipment 10. For example, the modem 100 may be configured to perform communication functions, such as modulation of signals transmitted to the base station 20 and/or demodulation of signals received from the base station 20, various encoding and/or decoding for communication with the base station 20, and/or the like.

In an example embodiment, the modem 100 may include a synchronization signal detector 110. According to some example embodiments, operations described herein as being performed by the user equipment 10, the modem 100 and/or the synchronization signal detector 110 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. For example, the synchronization signal detector 110 may be a hardware block including an analog circuit and/or a digital circuit. According to some example embodiments, the modem 100 may further include a processor, and the synchronization signal detector 110 may be a software block including a plurality of instructions executed by the processor.

The synchronization signal detector 110 may cumulatively receive a wireless signal output from the base station 20 (e.g., the synchronization signal detector 110 may receive and/or, buffer and/or store, the wireless signal over a period of time) and detect a synchronization signal included in the cumulatively received signal. In an example embodiment, the synchronization signal detector 110 may perform, on a per-frame basis, a correlation calculation between each of a plurality of sub-frames included in a frame and a plurality of reference signals that are preset or set. By combining correlation values generated as a result of performing the correlation calculation as many times as an accumulation count, the synchronization signal detector 110 may generate synchronization signal measurement values for respective frequencies and may determine, based on the synchronization signal measurement values, whether a valid synchronization signal is detected.

The synchronization signal detector 110 according to the inventive concepts may change the accumulation count based on whether a valid synchronization signal is detected. In one example, by combining correlation values as many times as a first accumulation count, the synchronization signal detector 110 may generate sub-frames and/or generate first synchronization signal measurement values for respective frequencies in correspondence with the sub-frames, and may determine whether a valid synchronization signal measurement value corresponding to a valid synchronization signal is included in the first synchronization signal measurement values. When the valid synchronization signal measurement value is not found from the first synchronization signal measurement values, by combining correlation values as many times as a second accumulation count that is different from the first accumulation count, the synchronization signal detector 110 may generate second synchronization signal measurement values for respective frequencies and may determine whether a valid synchronization signal measurement value is included in the second synchronization signal measurement values. When the valid synchronization signal measurement value is found from the second synchronization signal measurement values, the modem 100 may determine, as a synchronization frequency, a frequency corresponding to the valid synchronization signal measurement value and may perform synchronization with the base station 20 based thereon.

In a synchronization operation, the synchronization signal detector 110 may detect an NPSS as a synchronization signal. For example, the user equipment 10 may find frame boundary information through the detected NPSS. In addition, the user equipment 10 may further find frequency offset information, which is to be reflected during the detection of an NSSS, through the detected NPSS. Further, in the synchronization operation, the synchronization signal detector 110 may detect an NSSS as a synchronization signal.

Figure 2:
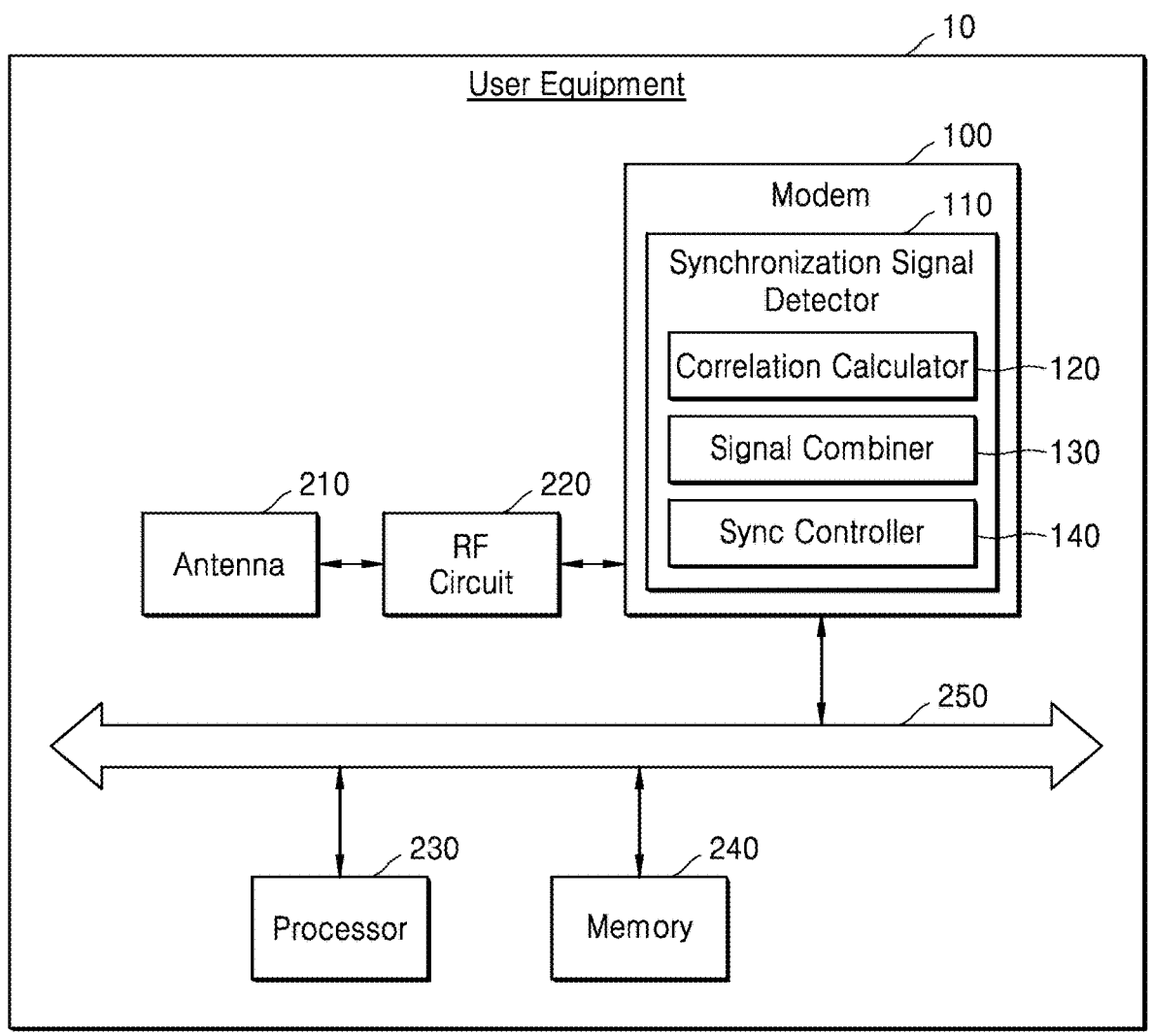
FIG. 2 is a block diagram illustrating user equipment according to an example embodiment of the inventive concepts.

FIG. 2 is a block diagram illustrating user equipment according to an example embodiment of the inventive concepts. FIG. 2 may be a block diagram of the user equipment 10 in FIG. 1.

Referring to FIG. 2, the user equipment 10 may include an antenna 210, a radio frequency (RF) circuit 220, the modem 100, a processor 230, memory 240, and/or a system interconnect 250. Each of the components included in the user equipment 10 (e.g., the RF circuit 220 and/or the modem 100) may be implemented using processing circuitry (e.g., a hardware block including an analog circuit and/or a digital circuit and/or a software block including a plurality of instructions executed by a processor, such as the processor 230, and/or the like).

The RF circuit 220 may receive, via the antenna 210, a wireless signal transmitted by the base station 20. For example, the RF circuit 220 may move (e.g., convert) a wireless signal in a frequency band having a high center frequency into a base band (e.g., a base band signal) and thus output the wireless signal (e.g., the base band signal) to the modem 100. In other words, the RF circuit 220 may demodulate a received wireless signal such that the received wireless signal is able to be signal-processed by the modem 100 and/or the processor 230, and/or stored in the memory 240. In addition, the RF circuit 220 may receive data from the modem 100, modulate the data, and thus transmit the modulated data to the base station 20 via the antenna 210.

The processor 230 may include an intelligent hardware device such as a central processing unit (CPU), a microcontroller, an application processor, and/or a graphics processing unit (GPU). The memory 240 may include, for example, a volatile memory device such as dynamic random access memory (DRAM) and/or synchronous dynamic random access memory (SDRAM). In addition, the memory 240 may include, for example, a non-volatile memory device such as electrically erasable programmable read-only memory (EEPROM), flash memory, phase change random access memory (PRAM), resistance random access memory (RRAM), nano floating gate memory (NFGM), polymer random access memory (PoRAM), magnetic random access memory (MRAM), and/or ferroelectric random access memory (FRAM).

The memory 240 may store software code that is computer readable and/or computer executable and includes a plurality of instructions. For example, the memory 240 may store a plurality of signal processing algorithms for processing signals received and/or to be transmitted via wireless communication.

The system interconnect 250 may be implemented as a bus to which a protocol having a certain standard bus specification is applied. For example, as the standard bus specification, an Advanced Microcontroller Bus Architecture (AMBA) protocol by Advanced RISC Machine (ARM) Ltd. may be applied. A bus type of the AMBA protocol may include Advanced High-Performance Bus (AHB), Advanced Peripheral Bus (APB), Advanced eXtensible Interface (AXI), AXI4, AXI Coherency Extensions (ACE), and/or the like.

The modem 100 may include the synchronization signal detector 110, and the synchronization signal detector 110 may detect synchronization signals (for example, an NPSS and/or an NSSS) based on a wireless signal in which a generation time point of each of the synchronization signals is defined. The synchronization signal detector 110 may include a correlation calculator 120, a signal combiner 130, and/or a synchronization controller 140. The correlation calculator 120 may calculate, on a per-frame basis for each frequency, correlation values by performing a correlation calculation between each sub-frame of a received wireless signal and predefined or defined reference signals.

The signal combiner 130 may accumulate correlation values corresponding to each of a plurality of frequencies into a synchronization signal measurement value for each frequency, based on an accumulation count. In one example, the signal combiner 130 may generate a first synchronization signal measurement value by accumulating at least one correlation value (e.g., a first set of correlation values) corresponding to a first frequency as many times as an accumulation count (e.g., the first set of correlation values accumulated may have a quantity or number equal or similar to the accumulation count) and may generate a second synchronization signal measurement value by accumulating at least one correlation value (e.g., a second set of correlation values) corresponding to a second frequency as many times as an accumulation count (e.g., the second set of correlation values accumulated may have a quantity or number equal or similar to the accumulation count).

The synchronization controller 140 may detect a valid synchronization signal measurement value based on a plurality of synchronization signal measurement values corresponding to a plurality of frequencies. In an embodiment, the synchronization controller 140 may calculate measurement metrics based on a plurality of synchronization signal measurement values and may determine, as a valid synchronization signal measurement value, a synchronization signal measurement value corresponding to a measurement metric consistent with a preset or set criterion.

When detecting the valid synchronization signal measurement value, the synchronization controller 140 may store a frequency corresponding to the valid synchronization signal measurement value in a synchronization frequency list and may perform a synchronization operation by using a synchronization frequency stored in the synchronization frequency list. This will be described below in detail with reference to FIG. 14.

When not detecting the valid synchronization signal measurement value, the synchronization controller 140 may detect a valid synchronization signal measurement value by using a changed accumulation count. In an embodiment, the synchronization controller 140 may store an accumulation count list and may change the accumulation count based on the accumulation count list. The correlation calculator 120 and the signal combiner 130 may generate a plurality of synchronization signal measurement values based on the changed accumulation count, and the synchronization controller 140 may detect a valid synchronization signal measurement value based thereon. According to some example embodiments, operations described herein as being performed by the correlation calculator 120, the signal combiner 130, and/or the synchronization controller 140 may be performed by processing circuitry.

According to the inventive concepts, the synchronization controller 140 may detect a synchronization frequency corresponding to a valid synchronization signal measurement value by adaptively changing an accumulation count, whereby excessive repetitions of accumulating correlation values by the signal combiner 130 may be prevented or reduced, and efficient search for a synchronization frequency may be performed.

Figure 3:
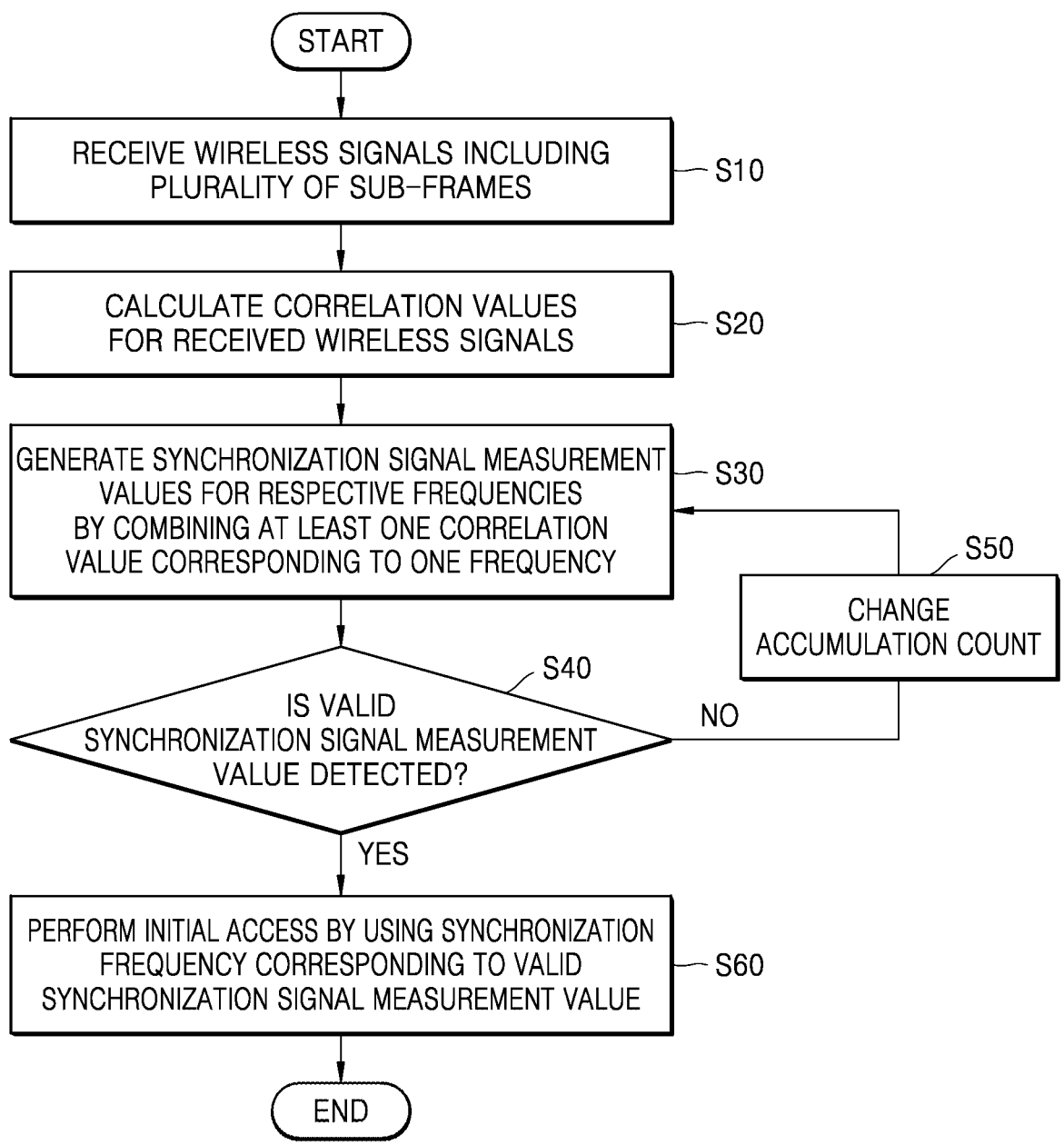
FIG. 3 is a flowchart illustrating operations of a synchronization signal detector, according to an example embodiment of the inventive concepts.

FIG. 3 is a flowchart illustrating operations of a synchronization signal detector, according to an example embodiment of the inventive concepts.

Referring to FIGS. 2 and 3, the synchronization signal detector 110 may receive wireless signals including a plurality of sub-frames respectively corresponding to a plurality of frequencies (e.g., such that each sub-frame corresponds to a different frequency) (S10). The synchronization signal detector 110 may calculate correlation values for the received wireless signals (S20). In an embodiment, the synchronization signal detector 110 may generate correlation values by performing a correlation calculation on the received wireless signals and a predefined or defined reference signal.

The synchronization signal detector 110 may generate synchronization signal measurement values for respective frequencies (e.g., each frequency) by combining at least one correlation value corresponding to one frequency as many times as an accumulation count (S30). In an embodiment, the synchronization signal detector 110 may generate synchronization signal measurement values by combining at least one correlation value corresponding to one frequency.

The synchronization signal detector 110 may determine whether a valid synchronization signal measurement value consistent with a preset or set condition is detected from among the generated synchronization signal measurement values for respective frequencies (S40). When the valid synchronization signal measurement value is not detected, in operation S50, the synchronization signal detector 110 may regenerate synchronization signal measurement values for respective frequencies by changing the accumulation count and returning to operation S30. When the valid synchronization signal measurement value is detected, the synchronization signal detector 110 may determine, as a synchronization frequency, a frequency corresponding to the valid synchronization signal measurement value and may perform initial access (e.g., initiating a communication link with the base station 20) by using the synchronization frequency (S60).

Figure 4:
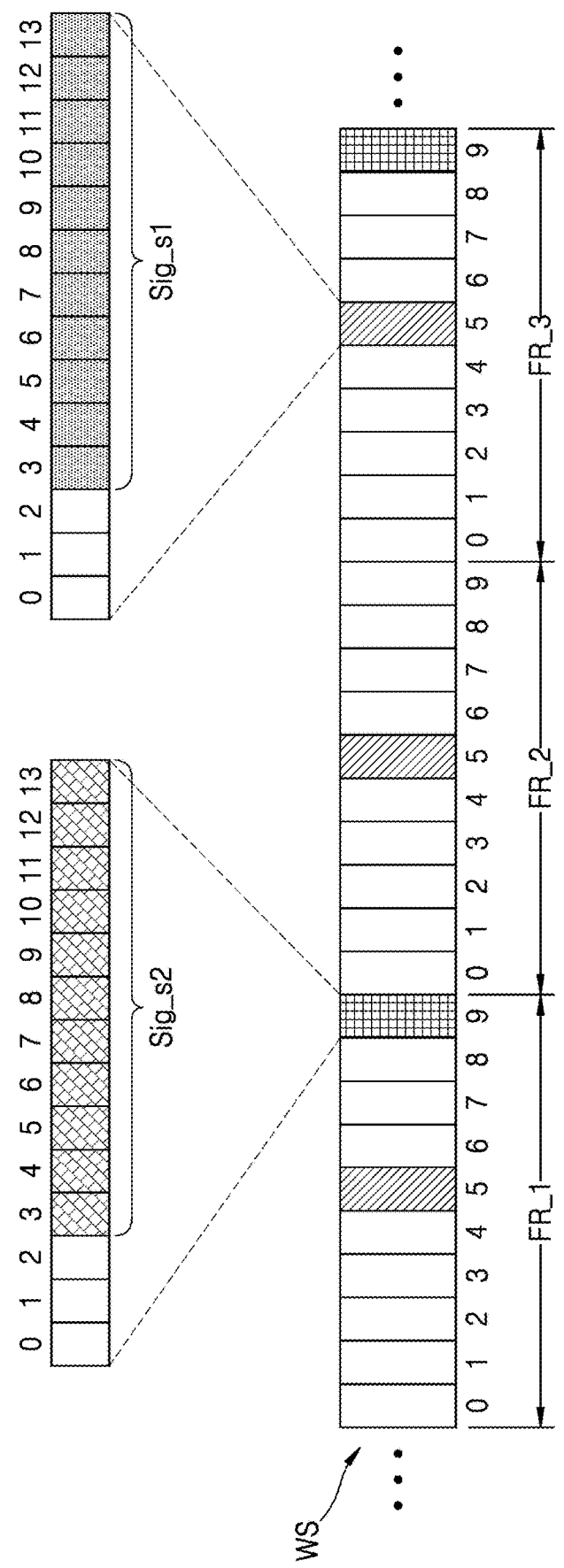
FIG. 4 is a schematic diagram of a wireless signal according to an example embodiment of the inventive concepts.

FIG. 4 is a schematic diagram of a wireless signal according to an example embodiment of the inventive concepts.

Referring to FIG. 4, a wireless signal WS output from the base station 20 may include a plurality of frames FR_1 to FR_3 (e.g., FR_1, FR_2 and FR_3), and each frame may include a plurality of sub-frames (for example, sub-frames numbered 0 to 9). In the wireless signal WS, the generation (or position) of each of a first synchronization signal Sig_s1 (for example, an NPSS) and/or a second synchronization signal Sig_s2 (for example, an NSSS) may be defined at preset or set time intervals. For example, the base station 20 may transmit the first synchronization signal Sig_s1 and the second synchronization signal Sig_s2 in a narrow band region of a downlink system bandwidth.

In one example, the first synchronization signal Sig_s1 may be defined in the number 5 sub-frame for each of the frames FR_1 to FR_3. Specifically, each sub-frame may include a plurality of symbols (for example, symbols numbered 0 to 13), and an NPSS may be defined in the symbols numbered 3 to 13 in the number 5 sub-frame of each frame. For example, the first synchronization signal Sig_s1 may be transmitted via a plurality of adjacent OFDM symbols (for example, a plurality of adjacent OFDM symbols in the number 5 sub-frame). In an example embodiment, the first synchronization signal Sig_s1 may be a sequence encoded by the base station 20 based on a Zadoff-Chu method.

In an example embodiment, the second synchronization signal Sig_s2 (for example, an NSSS) may be defined in the number 9 sub-frame of alternating frames (for example, FR_1 and FR_3 of frames FR_1 to FR_3). Specifically, the second synchronization signal Sig_s2 may be defined in the symbols numbered 3 to 13 in the number 9 sub-frame of alternating frames. For example, the second synchronization signal Sig_s2 may be transmitted via a plurality of adjacent OFDM symbols (for example, a plurality of adjacent OFDM symbols in the number 9 sub-frame). In an example embodiment, the second synchronization signal Sig_s2 may be a sequence encoded by the base station 20 based on at least one selected from the group of a Zadoff-Chu method, a Hadamard method, and/or a Phase rotation method.

According to the inventive concepts, when a search for the first synchronization signal Sig_s1 and/or the second synchronization signal Sig_s2 is performed, the synchronization signal detector 110 may generate a plurality of synchronization signal measurement values corresponding to respective sub-frames based on an accumulation count and, when there is no valid synchronization signal measurement value in the plurality of synchronization signal measurement values, may perform re-search after changing the accumulation count.

Figure 5:
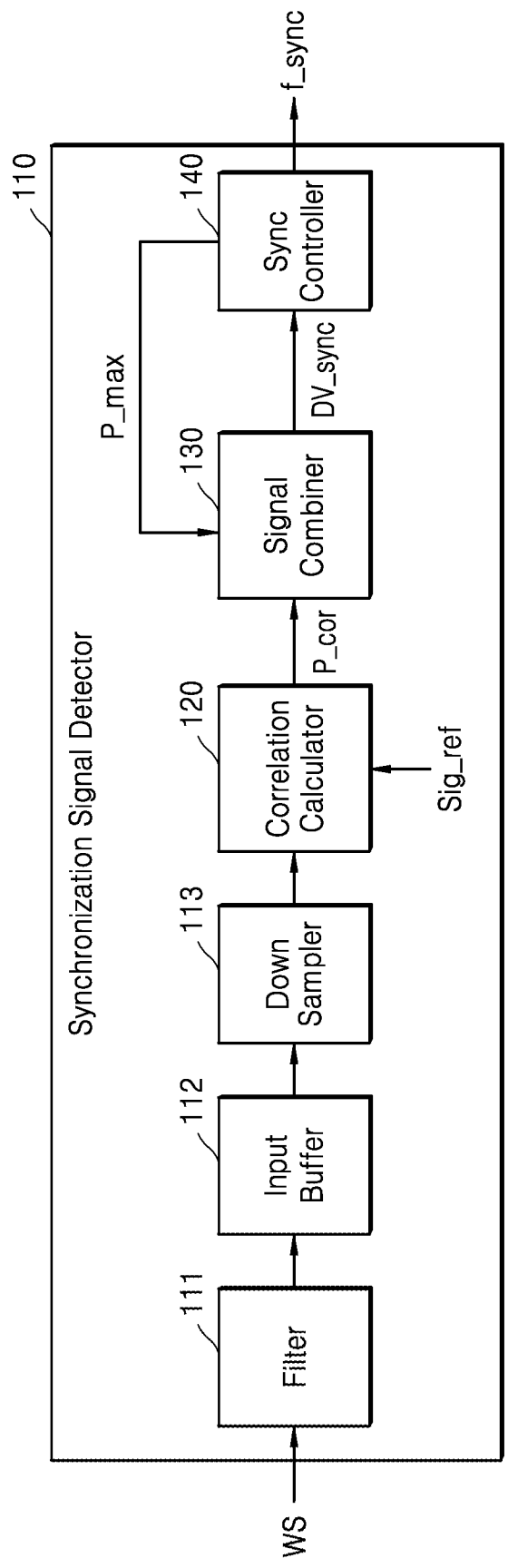
FIG. 5 is a block diagram illustrating a synchronization signal detector according to an example embodiment of the inventive concepts.

FIG. 5 is a block diagram illustrating a synchronization signal detector according to an example embodiment of the inventive concepts. In one example, FIG. 5 may illustrate a specific configuration of the synchronization signal detector 110 in FIG. 2.

Referring to FIG. 5, the synchronization signal detector 110 may include a filter 111, an input buffer 112, a down sampler 113, the correlation calculator 120, the signal combiner 130, and/or the synchronization controller 140. The filter 111 may remove or suppress, from a received wireless signal WS, a signal (e.g., noise) in a frequency band other than that of a signal (for example, a synchronization signal) intended to be received. For example, the filter 111 may include a low-pass filter.

The input buffer 112 may buffer a signal filtered by the filter 111. In an example embodiment, the input buffer 112 may sample a signal filtered by the filter 111 at a certain sampling rate and/or store the sampled signal.

The down sampler 113 may down-sample the signal stored in the input buffer 112 at a certain sampling rate. For example, the down sampler 113 may ⅛-down-sample the signal stored in the input buffer 112 and output the down-sampled signal to the correlation calculator 120. However, this is merely an example and the down sampling rate may be variously changed. According to some example embodiments, operations described herein as being performed by the filter 111, the input buffer 112 (e.g., the sampling of the signal), and/or the down sampler 113 may be performed by processing circuitry.

The correlation calculator 120 may perform a correlation calculation on the down-sampled signal and a preset or set reference signal Sig_ref. For example, the correlation calculator 120 may output correlation values P_cor by performing a correlation calculation between a received signal and reference signals, on a per-frame basis. In one example, the correlation calculator 120 may perform a correlation calculation between a received signal and reference signals, based on one of a full-correlation method, a symbol-based correlation method, and/or a differential correlation method. According to some example embodiments, the reference signal Sig_ref may correspond to pilot signals included in the received wireless signal WS as would be understood by a person of ordinary skill in the art.

The signal combiner 130 may generate synchronization signal measurement values DV_sync by combining the correlation values P_cor and output the synchronization signal measurement values DV_sync to the synchronization controller 140. In an embodiment, the signal combiner 130 may determine the number of correlation values P_cor to be combined, based on an accumulation count P_max received from the synchronization controller 140.

The synchronization controller 140 may determine, based on the received synchronization signal measurement values DV_sync for respective frequencies, whether a valid synchronization signal measurement value is detected. In one example, when the valid synchronization signal measurement value is not detected, the synchronization controller 140 may change the accumulation count P_max, provide the changed accumulation count P_max to the signal combiner 130, and then detect a valid synchronization signal measurement value based on newly received synchronization signal measurement values DV_sync. In another example, when the valid synchronization signal measurement value is detected, the synchronization controller 140 may output a synchronization frequency f_sync corresponding to the valid synchronization signal measurement value or may output information (for example, EARFCN) about a channel corresponding thereto.

Figure 6:
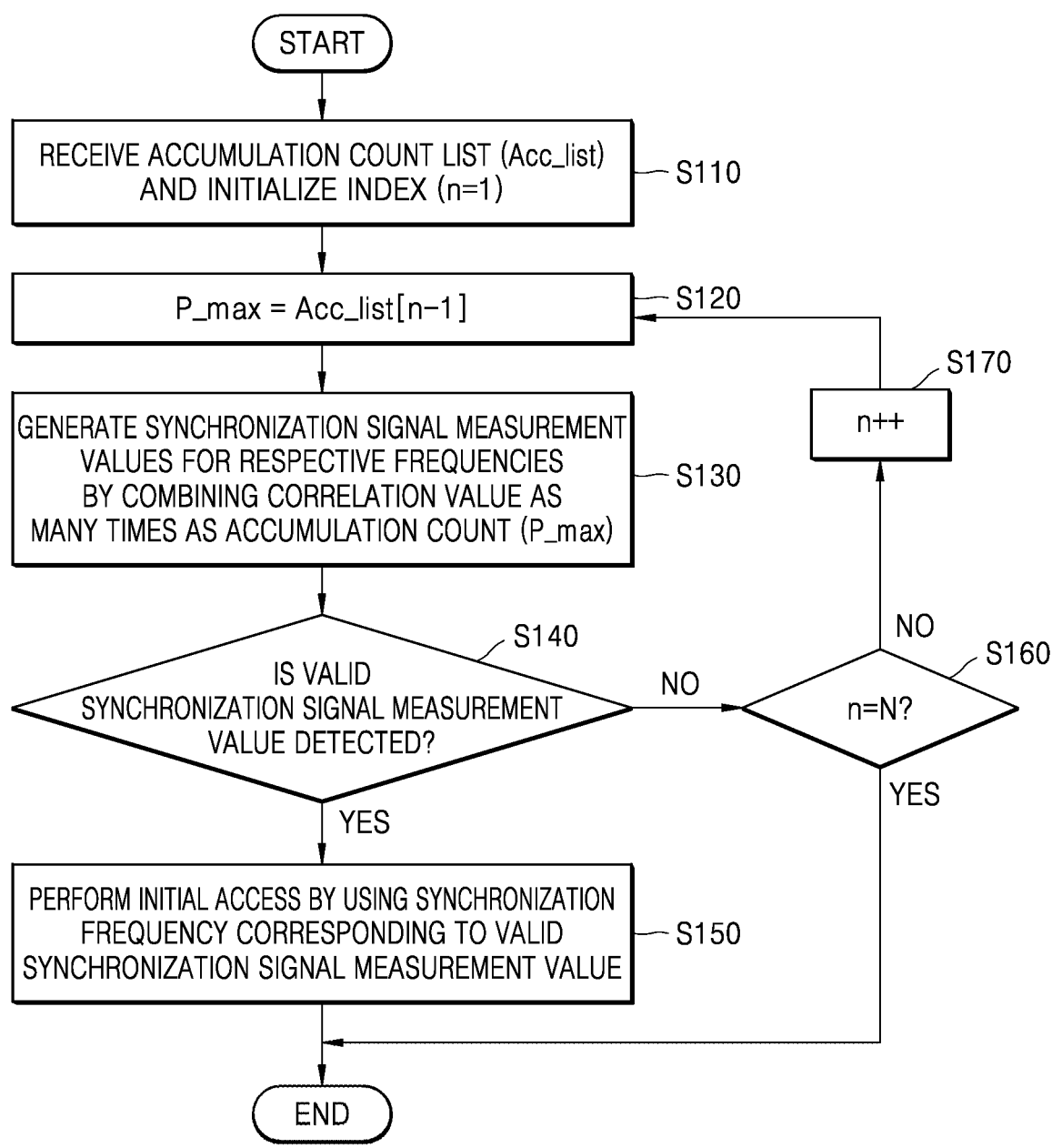
FIG. 6 is a flowchart illustrating operations of a modem for adaptively changing an accumulation count, according to an example embodiment of the inventive concepts.

FIG. 6 is a flowchart illustrating operations of a modem, according to an example embodiment of the inventive concepts. In particular, FIG. 6 illustrates an embodiment in which a synchronization signal detector included in a modem adaptively changes an accumulation count to detect a valid synchronization signal measurement value.

Referring to FIGS. 5 and 6, the synchronization signal detector 110 may receive an accumulation count list Acc_list and initialize an index n (S110). In an embodiment, the accumulation count list Acc_list may refer to a list including a plurality of numbers (e.g., counts) that may be substituted for an accumulation count (e.g., a current accumulation count). The synchronization signal detector 110 may store the accumulation count list Acc_list. In an embodiment, the synchronization signal detector 110 may receive the accumulation count list Acc_list (e.g., a new accumulation count list) from outside thereof (e.g., an external source) and may update and/or replace the existing accumulation count list Acc_list based thereon. The accumulation count list Acc_list will be described below in detail with reference to FIG. 7.

The synchronization signal detector 110 may substitute a first component Acc_list[0] of the accumulation count list Acc_list for the accumulation count P_max (S120) (e.g., update the accumulation count by replacing a current value of the accumulation count with the first component of the accumulation count list) and combine a correlation value as many times as the accumulation count P_max, thereby generating synchronization signal measurement values for respective frequencies (S130). The synchronization signal detector 110 may detect a valid synchronization signal measurement value by determining whether the valid synchronization signal measurement value consistent with a preset or set criterion is included in the generated synchronization signal measurement values for respective frequencies (S140).

When the valid synchronization signal measurement value is detected, the modem 100 may perform initial access by using a synchronization frequency corresponding to the valid synchronization signal measurement value (S150). This will be described below in detail with reference to FIG. 13 or the like.

When the valid synchronization signal measurement value is not detected, the synchronization signal detector 110 may determine whether the index n equals the number of all components (N) included in the accumulation count list Acc_list (S160). When the index n equals the number of all components (N) of the accumulation count list Acc_list, it may be meant that all the components in the accumulation count list Acc_list have been used, and in this case, a new accumulation count list Acc_list may be requested and/or a cell search operation of the user equipment 10 may be stopped.

When the index n does not equal the number of all components (N) of the accumulation count list Acc_list, the synchronization signal detector 110 may increase the index n (e.g., increment the value of the index by one) (S170), substitute the next component Acc_list[n−1] of the accumulation count list Acc_list for the accumulation count P_max (e.g., return to operation S120), and then perform an operation of detecting a valid synchronization signal measurement value again (S130, S140).

According to the inventive concepts, whether a valid synchronization signal measurement value is detected may be determined and the accumulation count P_max is changed based on a result of the determination, whereby the valid synchronization signal measurement value may be detected based on an efficient accumulation count P_max, and as a result, a time period used to perform a cell search may be reduced.

FIG. 7 illustrates tables each illustrating an accumulation count list, according to an example embodiment of the inventive concepts.

Referring to FIGS. 5 and 7, a first accumulation count list Acc_list1 may include '1', '2', '4', '8', and '16' as components (e.g., values). In one example, the synchronization signal detector 110 may use, as an accumulation count, '1' that is a first component of the first accumulation count list Acc_list1 (e.g., the first component may correspond to the index n=1). That is, the synchronization signal detector 110 may generate synchronization signal measurement values for respective frequencies by combining a correlation value once and may detect a valid synchronization signal measurement value based on the generated synchronization signal measurement values for respective frequencies. When the valid synchronization signal measurement value is not detected, the synchronization signal detector 110 may detect a valid synchronization signal measurement value by using, as the accumulation count, '2' that is a second component of the first accumulation count list Acc_list1 (e.g., the first component may correspond to the index n=2). In a similar manner, the synchronization signal detector 110 may generate synchronization signal measurement values for respective frequencies while increasing the accumulation count, until a valid synchronization signal measurement value is detected.

In an embodiment, exponentially increasing components as in the first accumulation count list Acc_list1 may be substituted for the accumulation count. In an embodiment, components increasing by equal or similar differences (e.g., each component having a value an equal or similar amount higher than the previous component), as in a second accumulation count list Acc_list2, may be substituted for the accumulation count. In an embodiment, the components in the accumulation count list may be design parameters determined through empirical study.

Figure 8:
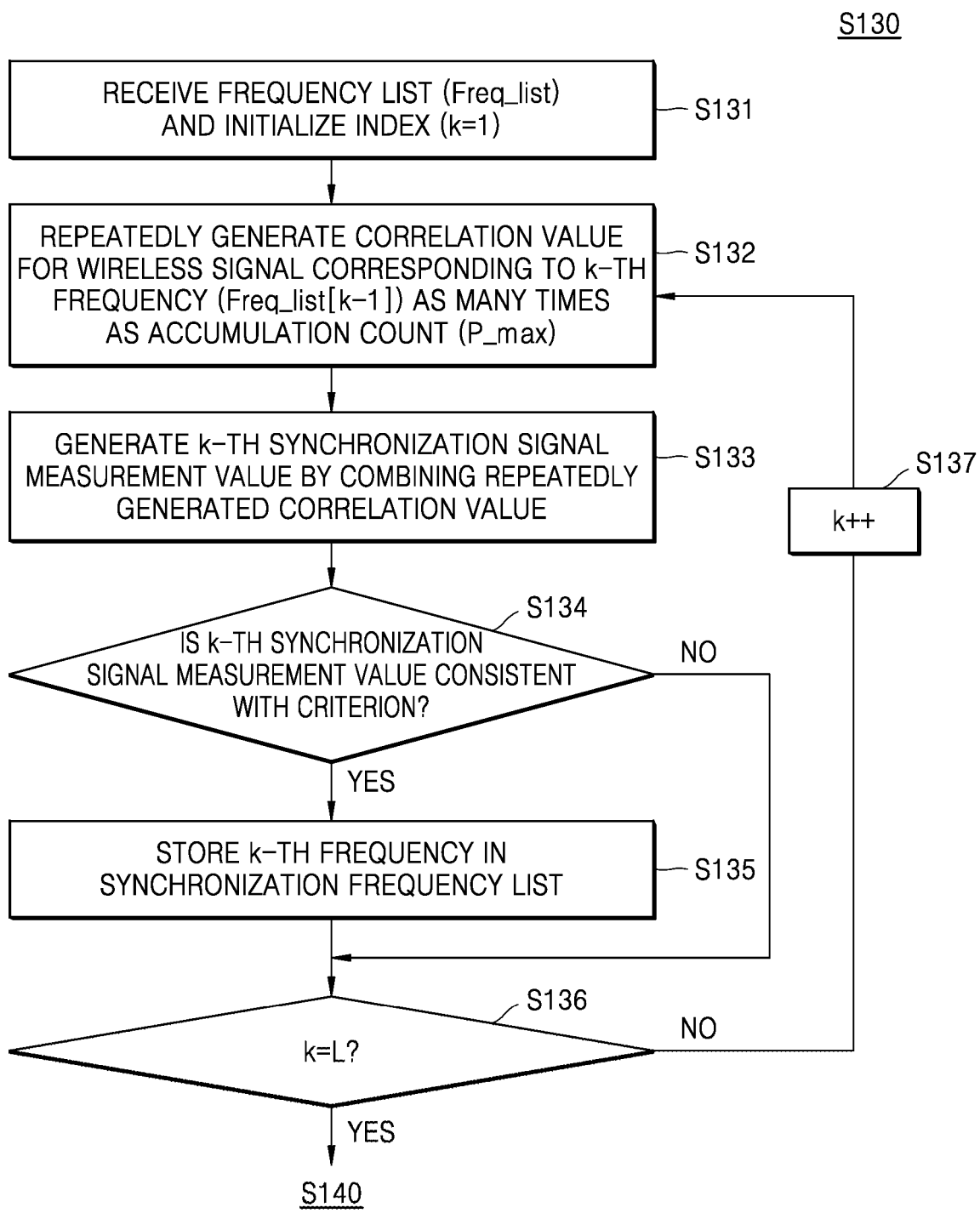
FIG. 8 is a flowchart illustrating operations of a synchronization signal detector for generating synchronization signal measurement values to generate a synchronization frequency list, according to an example embodiment of the inventive concepts.

FIG. 8 is a flowchart illustrating operations of a synchronization signal detector, according to an example embodiment of the inventive concepts. In particular, FIG. 8 may illustrate a method of generating synchronization signal measurement values for respective frequencies (S130) in FIG. 6 in detail.

Referring to FIGS. 5 and 8, the synchronization signal detector 110 may receive a frequency list Freq_list and initialize an index k (S131). The frequency list Freq_list may include information about a plurality of frequencies, for which search is to be performed, and/or include channel numbers corresponding to the plurality of frequencies. The synchronization signal detector 110 may repeatedly generate a correlation value (e.g., correlation values generated over successive frames) for a synchronization signal corresponding to a first frequency Freq_list[0] as many times as the accumulation count P_max (S132). For example, the synchronization signal detector 110 may generate a correlation value between the first frequency Freq_list[0] and one or more predefined or defined reference signals for each of a number of frames equal or similar to the accumulation count P_max. The synchronization signal detector 110 may generate a first synchronization signal measurement value corresponding to the first frequency Freq_list[0] by combining the repeatedly generated correlation values (S133). According to some example embodiments, the generated correlation values may be combined by summing or averaging the correlation values.

The synchronization signal detector 110 may determine whether the first synchronization signal measurement value is consistent with a preset or set criterion (S134). For example, the preset or set criterion may be whether the first synchronization signal measurement value is greater than a threshold value Lv_th (discussed further in association with FIGS. 10A-10B). When the first synchronization signal measurement value is consistent with the preset or set criterion (e.g., greater than the threshold value Lv_th), the synchronization signal detector 110 may store the first frequency and/or a channel number corresponding thereto in a synchronization frequency list (S135). When the first synchronization signal measurement value is not consistent with the preset or set criterion (e.g., not greater than the threshold value Lv_th), the synchronization signal detector 110 may not store the first frequency and/or the channel number corresponding thereto in the synchronization frequency list.

The synchronization signal detector 110 may determine whether the index k equals the number of all components (L) of the frequency list Freq_list (S136). That is, the synchronization signal detector 110 may determine whether synchronization signal measurement values for all frequencies of the frequency list Freq_list are generated. When the synchronization signal measurement values for all the frequencies of the frequency list Freq_list are not generated, the synchronization signal detector 110 may increase the index k (e.g., increment the index k by one) (S137) and may perform the same process or a similar process on a k-th frequency Freq_list[k−1] of the frequency list Freq_list (e.g., return to operation S132). When the synchronization signal measurement values for all the frequencies of the frequency list Freq_list are generated, it may be determined whether a valid synchronization signal measurement value is detected (S140 in FIG. 6).

Figure 9:
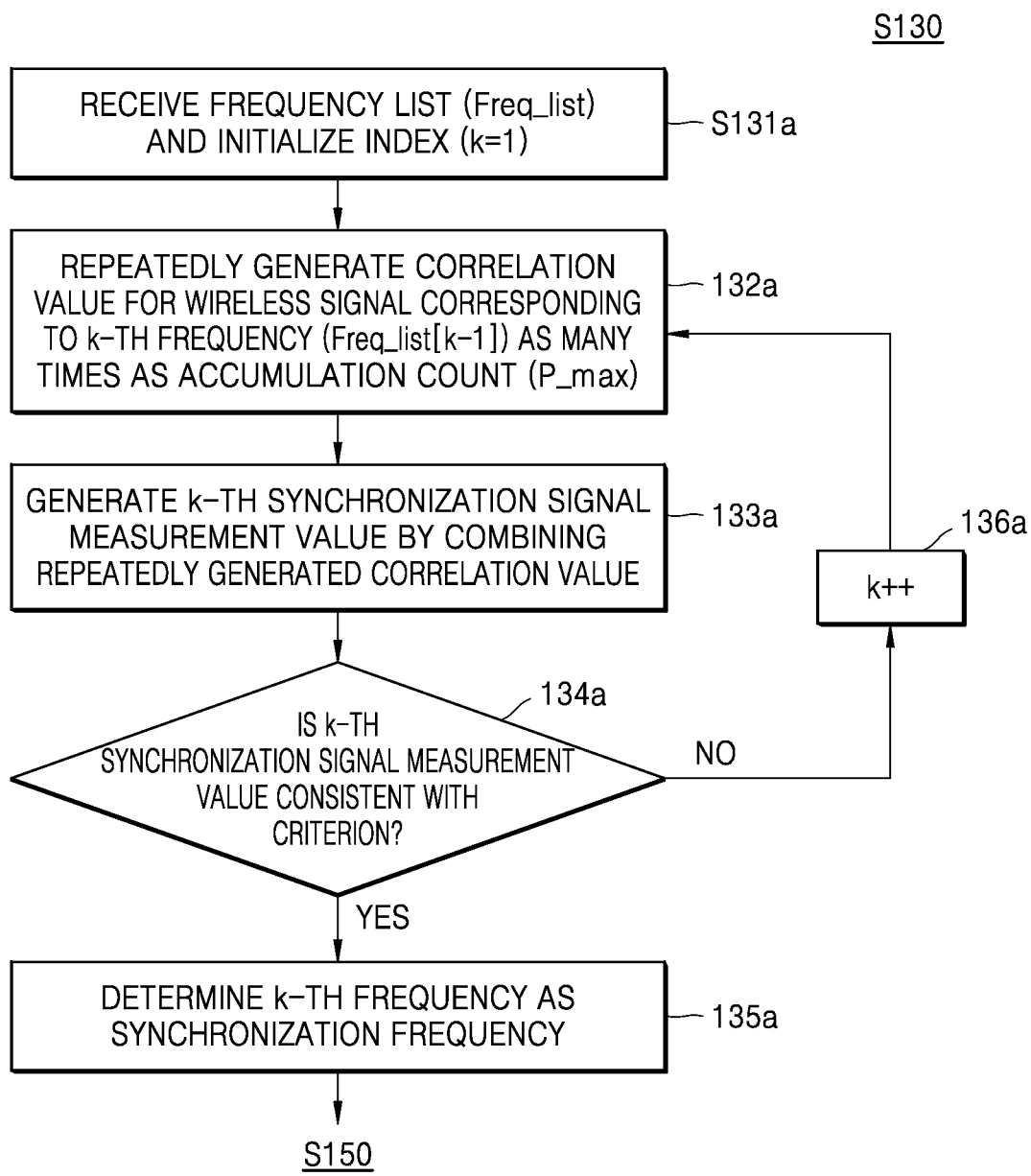
FIG. 9 is a flowchart illustrating operations of a synchronization signal detector for generating synchronization signal measurement values to determine a synchronization frequency, according to an example embodiment of the inventive concepts.

FIG. 9 is a flowchart illustrating operations of a synchronization signal detector, according to an example embodiment of the inventive concepts. In particular, FIG. 9 may illustrate a method of generating synchronization signal measurement values for respective frequencies (S130) in FIG. 6 in detail. Because operations S131a to S133a in FIG. 9 may be identical or similar to operations S131 to S133 in FIG. 8, descriptions thereof will be omitted.

Referring to FIGS. 5 and 9, the synchronization signal detector 110 may determine whether a k-th synchronization signal measurement value is consistent with a preset or set criterion (S134a). When the k-th synchronization signal measurement value is consistent with the preset or set criterion, the synchronization signal detector 110 may determine, as a synchronization frequency, a k-th frequency corresponding to the k-th synchronization signal measurement value and/or a channel number corresponding to the k-th frequency (S135a). Because the synchronization frequency is determined, the synchronization signal detector 110 may no longer generate a synchronization signal measurement value corresponding to another frequency and may perform initial access by using the determined synchronization frequency (S150 in FIG. 6).

When the k-th synchronization signal measurement value is not consistent with the preset or set criterion, the synchronization signal detector 110 may increase the index k (e.g., increment the index k by one) (S136a) and may repeat operations S132a to S134a.

Figure 10A:
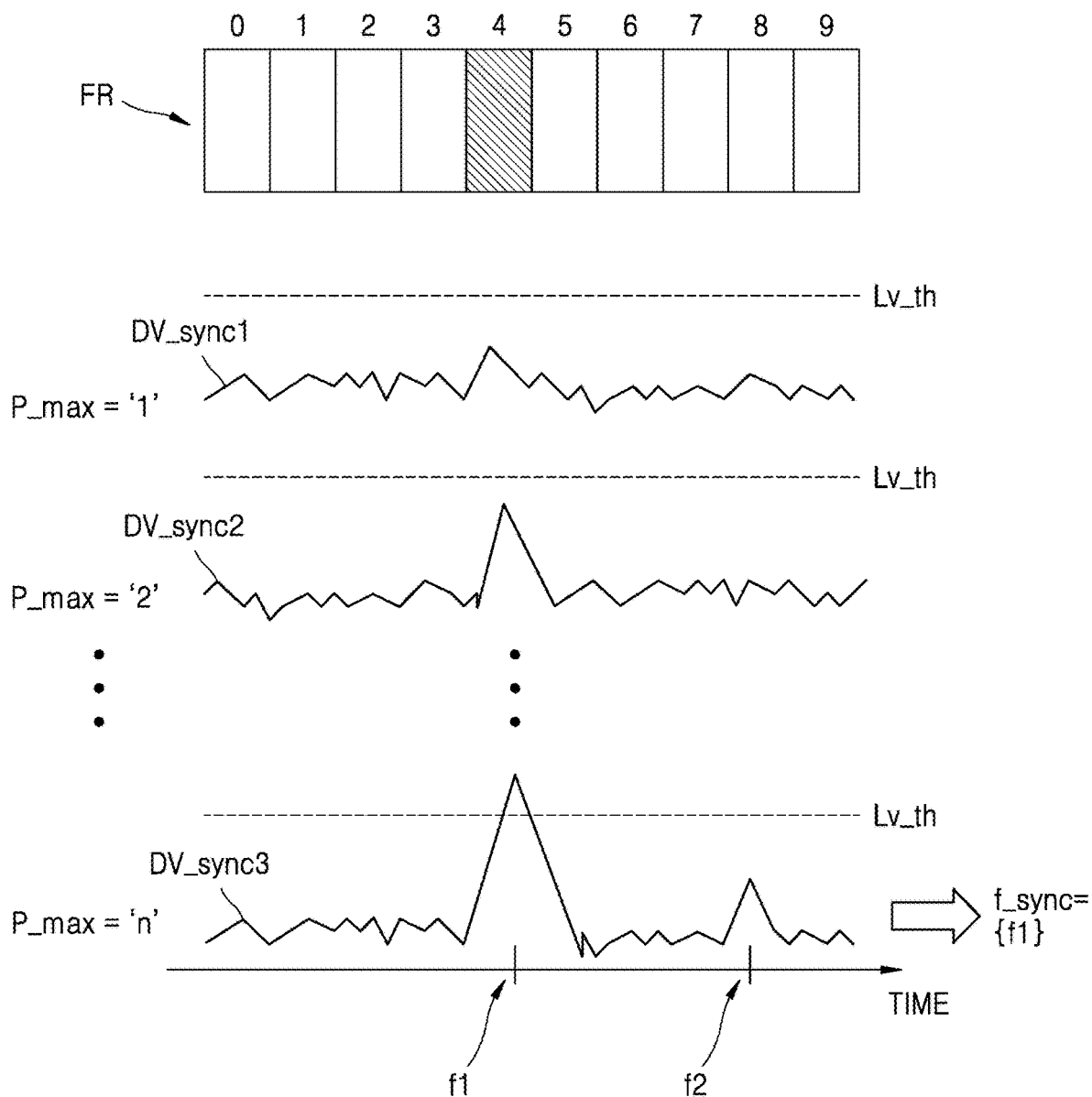
FIGS. 10A and 10B each illustrate diagrams illustrating operations of a synchronization signal detector, according to an example embodiment of the inventive concepts.
Figure 10B:
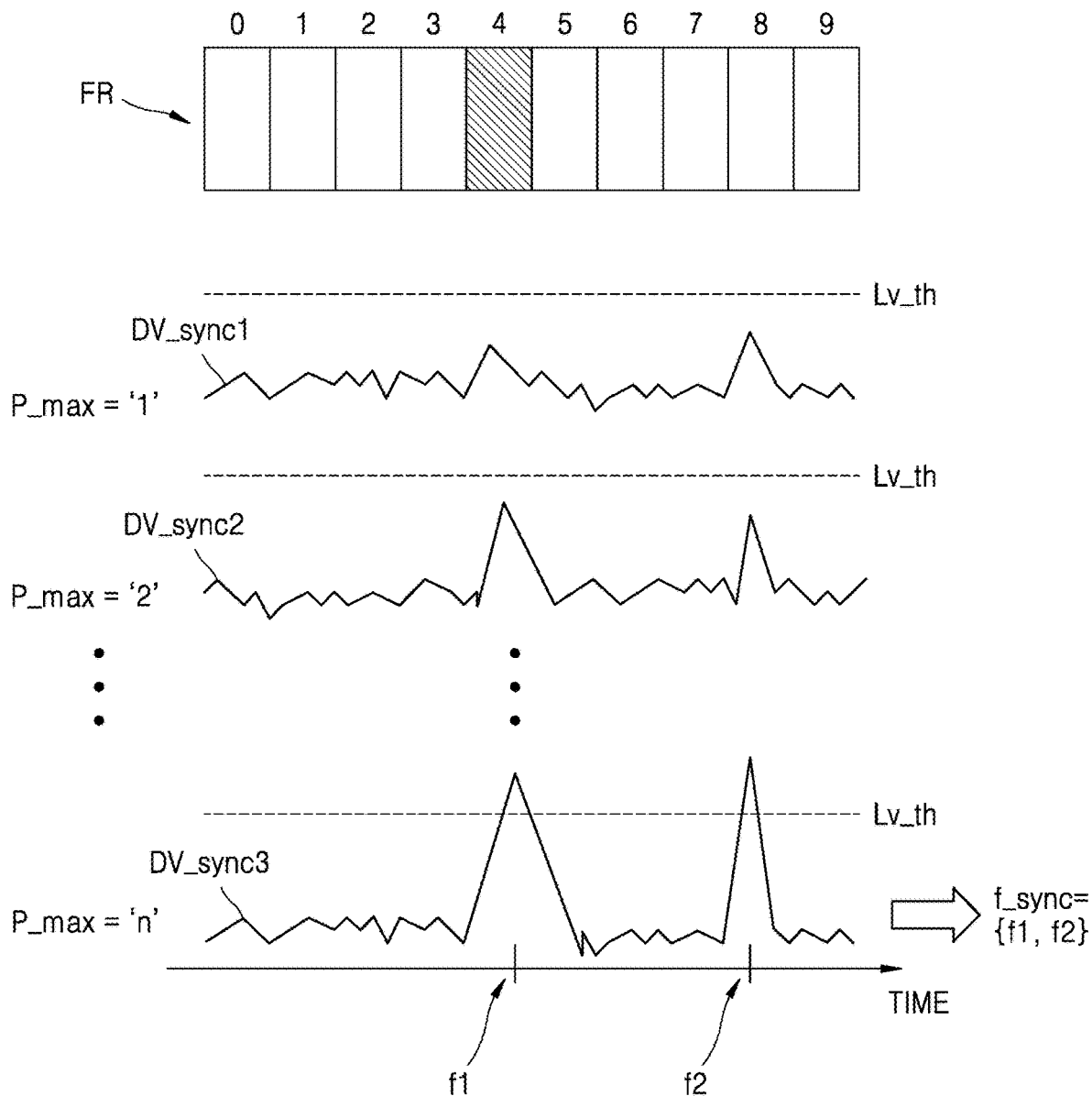

FIGS. 10A and 10B each illustrate diagrams illustrating operations of a synchronization signal detector, according to an example embodiment of the inventive concepts.

Referring to FIGS. 5 and 10A, first synchronization signal measurement values DV_sync1 for respective frequencies, which are generated by combining correlation values once (P_max='1') on a frame FR by frame FR basis, may not have greater values than a threshold value Lv_th for validity determination. The synchronization signal detector 110 may generate synchronization signal measurement values, based on the next accumulation count (for example, P_max='2') on the basis of an accumulation count list. Second synchronization signal measurement values DV_sync2 for respective frequencies, which are generated by combining correlation values twice (P_max='2'), may not have greater values than the threshold value Lv_th for validity determination.

Among third synchronization signal measurement values DV_sync3 generated by the synchronization signal detector 110 based on an accumulation count of n (where n is a natural number) (for example, P_max='n') on the basis of the accumulation count list, a synchronization signal measurement value corresponding to a first frequency f1 may have a greater value than the threshold value Lv_th.

Thus, the synchronization signal detector 110 may determine that a synchronization signal (for example, an NPSS or an NSSS) is defined in a number 4 sub-frame corresponding to the first frequency f1 and may determine the first frequency f1 as a synchronization frequency f_sync.

Referring to FIGS. 5 and 10B, among the third synchronization signal measurement values DV_sync3 for respective frequencies, which are generated by combining correlation values n times (P_max='n') on a frame FR by frame FR basis, third synchronization signal measurement values DV_sync3 corresponding to a plurality of frequencies may have greater values than the threshold value Lv_th for validity determination. The synchronization signal detector 110 may determine, as valid synchronization signal measurement values, the third synchronization signal measurement values DV_sync3 having greater values than the threshold value Lv_th and may determine a first frequency f1 and a second frequency f2, which correspond thereto, as synchronization frequencies f_sync. The synchronization signal detector 110 may perform initial access by using the first frequency f1 and the second frequency f2 and may perform synchronization by using, out of the first frequency f1 and the second frequency f2, the frequency successful in performing the initial access (e.g., the first frequency f1). According to some example embodiments, the threshold value Lv_th may be a design parameter determined through empirical study.

Figure 11:
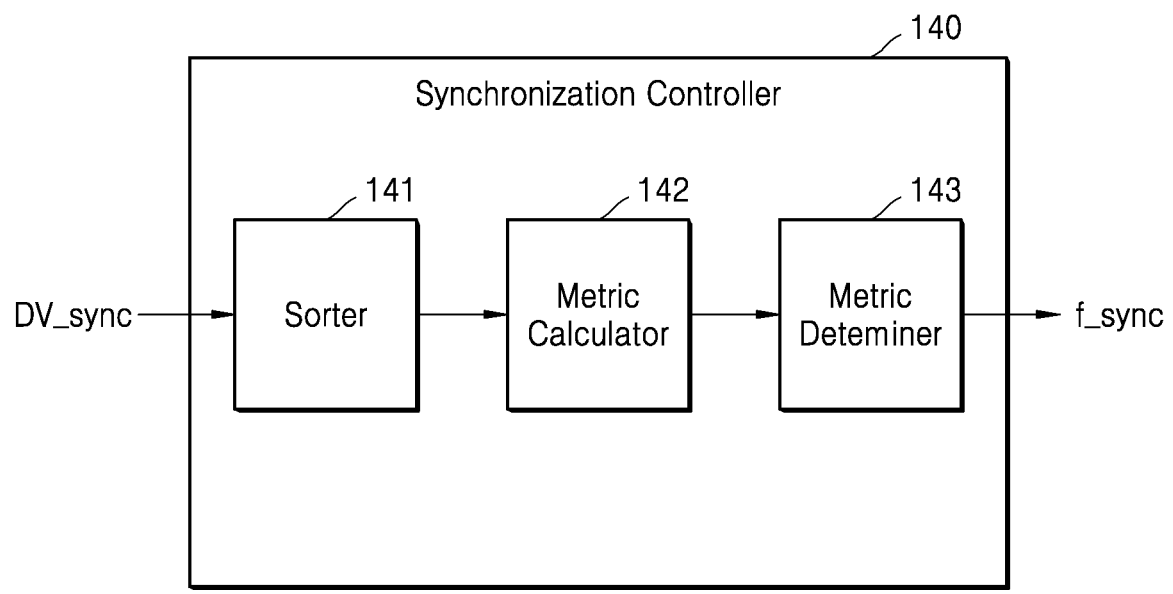
FIG. 11 is a block diagram illustrating a synchronization controller according to an example embodiment of the inventive concepts.

FIG. 11 is a block diagram illustrating a synchronization controller according to an example embodiment of the inventive concepts.

Referring to FIGS. 5 and 11, the synchronization controller 140 may include a sorter 141, a metric calculator 142, and/or a metric determiner 143. The sorter 141 may receive a plurality of synchronization signal measurement values DV_sync and may sort at least some of the plurality of synchronization signal measurement values DV_sync in descending or ascending order. According to some example embodiments, operations described herein as being performed by the sorter 141, the metric calculator 142 and/or the metric determiner 143 may be performed by processing circuitry.

The metric calculator 142 may calculate measurement metrics for a plurality of synchronization signal measurement values DV_sync that are sorted. In an embodiment, the metric calculator 142 may calculate the measurement metrics by dividing each of the plurality of synchronization signal measurement values DV_sync by a minimum value among the plurality of synchronization signal measurement values DV_sync (e.g., a lowest value synchronization signal measurement value among the sorted plurality of synchronization signal measurement values DV_sync). In an embodiment, the metric calculator 142 may calculate the measurement metrics by dividing the respective plurality of synchronization signal measurement values DV_sync by an average value of the plurality of synchronization signal measurement values DV_sync (e.g., of the sorted plurality of synchronization signal measurement values DV_sync).

The metric determiner 143 may determine a valid synchronization signal measurement value based on the measurement metrics. In an embodiment, the metric determiner 143 may compare the measurement metrics with a preset or set reference value (e.g., the threshold value Lv_th) and may determine, as a synchronization frequency f_sync, a frequency corresponding to a measurement metric that is greater than the reference value.

Figure 12:
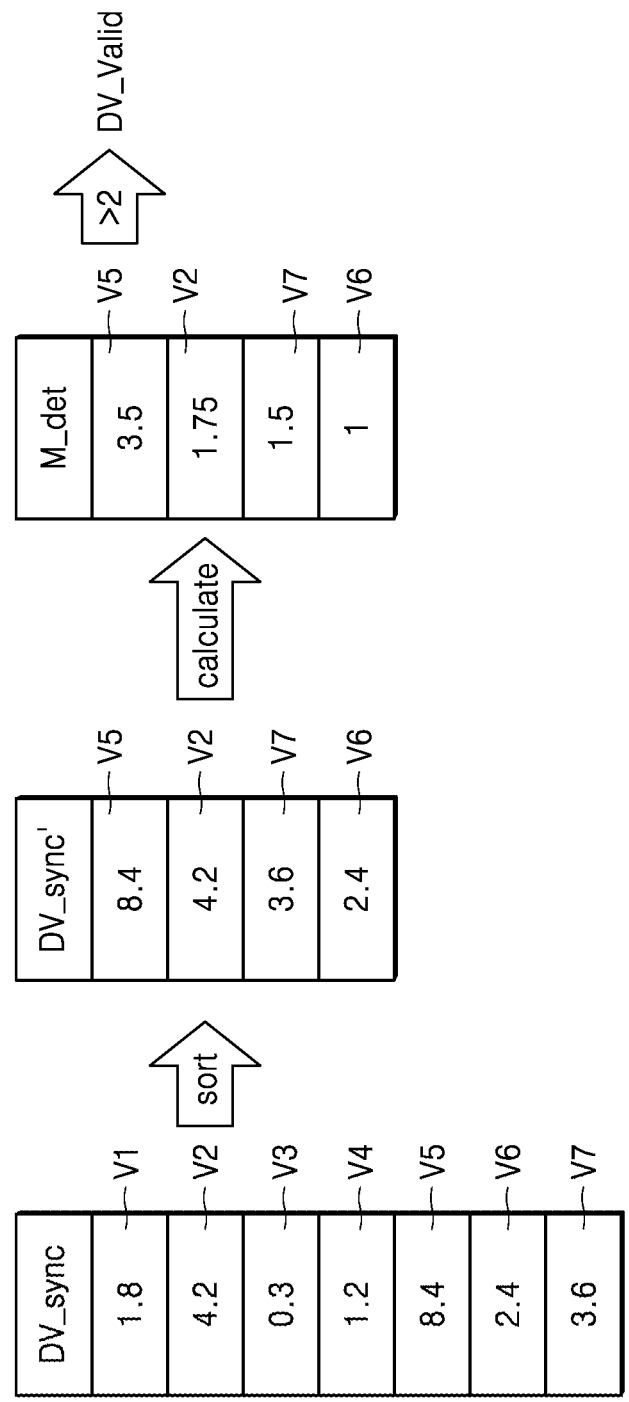
FIG. 12 is a diagram illustrating operations of a synchronization controller, according to an example embodiment of the inventive concepts.

FIG. 12 is a diagram illustrating operations of a synchronization controller, according to an example embodiment of the inventive concepts.

Referring to FIGS. 11 and 12, the sorter 141 may receive first to seventh values V1 to V7 as synchronization signal measurement values DV_sync for respective frequencies and may sort at least some of the synchronization signal measurement values DV_sync in descending order. Thus, the sorter 141 may output, to the metric calculator 142, sorted synchronization signal measurement values DV_sync' including the fifth value V5, the second value V2, the seventh value V7, and the sixth value V6 in descending order. The metric calculator 142 may generate measurement metrics M_det by dividing the sorted synchronization signal measurement values DV_sync' by a minimum value (e.g., lowest value) among the sorted synchronization signal measurement values DV_sync'. For example, among the sorted synchronization signal measurement values DV_sync', the minimum value is the sixth value V6 of '2.4'. The measurement metrics M_det may include '3.5' as the fifth value V5, '1.75' as the second value V2, '1.5' as the seventh value V7, and '1' as the sixth value V6.

The metric determiner 143 may determine whether each of the measurement metrics M_det is greater than '2' that is a preset or set reference (e.g., the threshold value Lv_th). The metric determiner 143 may determine the fifth value V5, which is greater than '2', as a valid synchronization signal measurement value DV_Valid and may determine a frequency corresponding thereto as a synchronization frequency.

Figure 13:
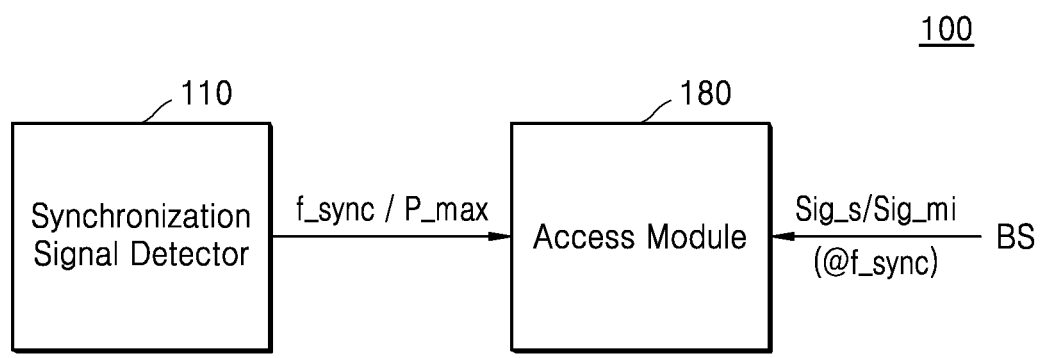
FIG. 13 is a block diagram illustrating a modem according to an example embodiment of the inventive concepts.

FIG. 13 is a block diagram illustrating a modem according to an example embodiment of the inventive concepts. Repeated descriptions given with reference to FIG. 5 will be omitted.

Referring to FIG. 13, the modem 100 may include the synchronization signal detector 110 and/or an access module 180, and the synchronization signal detector 110 may output, to the access module 180, the synchronization frequency f_sync detected as described above. In addition, the synchronization signal detector 110 may output, to the access module 180, the accumulation count P_max used for the detection of the synchronization frequency f_sync. According to some example embodiments, operations described herein as being performed by the access module 180 may be performed by processing circuitry.

The access module 180 may receive a synchronization signal Sig_s (for example, an NPSS and/or an NSSS) from a base station BS, based on the synchronization frequency f_sync. According to an embodiment of the inventive concepts, by cumulatively receiving the synchronization signal Sig_s from the base station BS (e.g., the base station 20) based on the accumulation count P_max, the access module 180 may determine whether the synchronization signal Sig_s is properly received. In one example, the access module 180 may cumulatively receive the synchronization signal Sig_s as many times as the accumulation count P_max used for the detection of the synchronization frequency f_sync. In another example, the access module 180 may cumulatively receive the synchronization signal Sig_s more times than the accumulation count P_max.

The access module 180 may receive a management information signal Sig_mi (for example, a narrowband physical broadcast channel (NPBCH), a narrowband physical downlink control channel (NPDCCH), a narrowband physical downlink shared channel (NPDSCH), a master information block (MIB), and/or a system information block (SIB)) from the base station BS (e.g., the base station 20), based on the synchronization frequency f_sync. According to an embodiment of the inventive concepts, the access module 180 may obtain management information by decoding the management information signal Sig_mi for a limit time period determined based on the accumulation count P_max.

Figure 14:
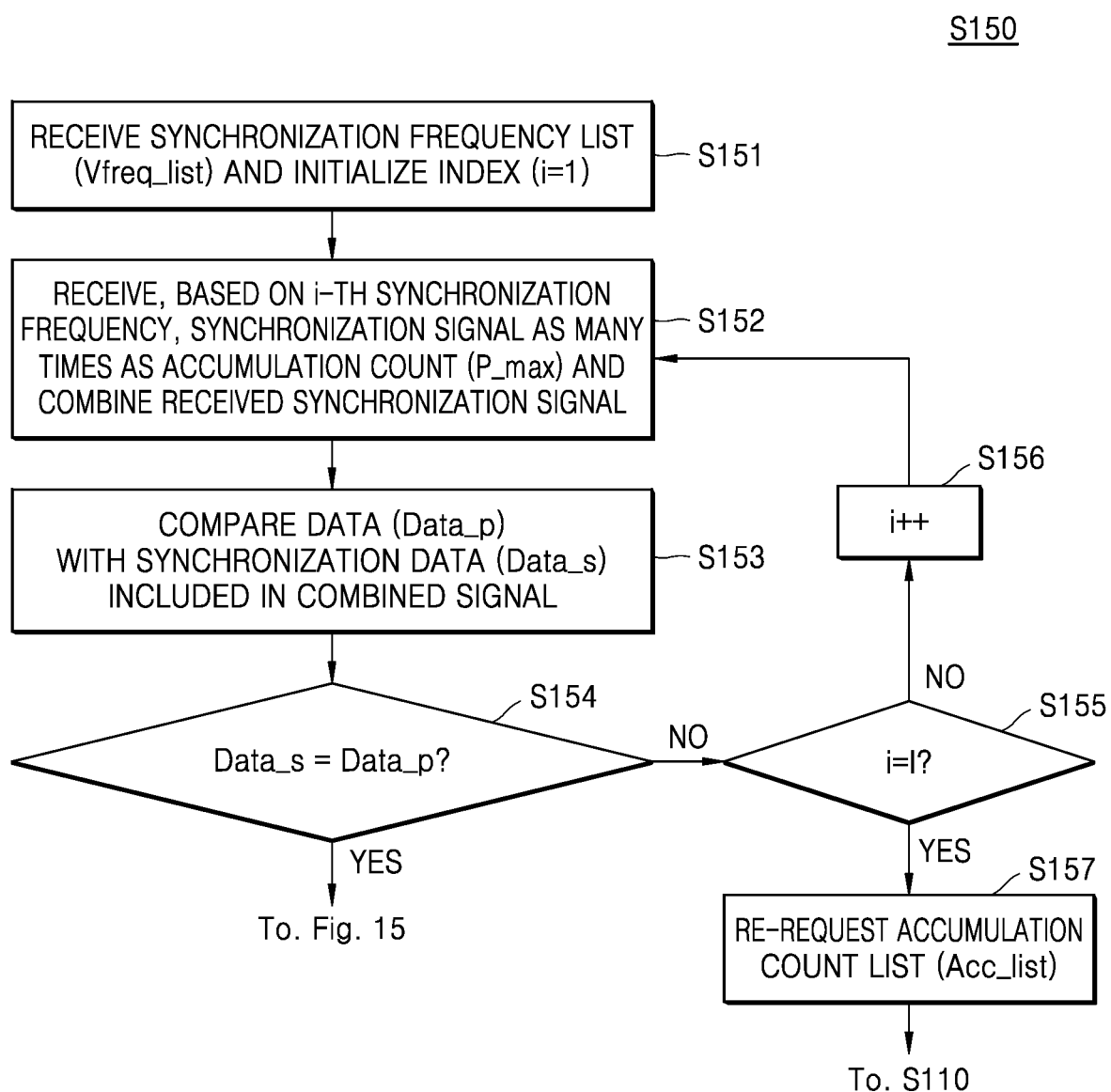
FIG. 14 is a flowchart illustrating a method of operating an access module for performing initial access for a synchronization signal, according to an example embodiment of the inventive concepts.

FIG. 14 is a flowchart illustrating a method of operating an access module, according to an example embodiment of the inventive concepts. In particular, FIG. 14 may illustrate performing initial access for a synchronization signal in a method of performing initial access (S150) in FIG. 6.

Referring to FIGS. 13 and 14, the access module 180 may receive a synchronization frequency list Sfreq_list from the synchronization signal detector 110 and may initialize an index i (e.g., the index i may be initialized with the value '1') (S151). The synchronization frequency list Sfreq_list may include information about at least one synchronization frequency corresponding to a valid synchronization signal measurement value. The access module 180 may receive and combine as many synchronization signals Sig_s as the accumulation count P_max by using a first synchronization frequency Sfreq_list[0] (S152). According to some example embodiments, the access module 180 may combine the received synchronization signals Sig_s by summing or averaging the received synchronization signals Sig_s.

The access module 180 may compare preset or set data Data_p (e.g., reference data) with synchronization data Data_s included in a combined synchronization signal (S153). When the synchronization data Data_s is not identical or similar to the preset or set data Data_p, the access module 180 may determine whether the index i equals the number of frequencies I included in the synchronization frequency list Sfreq_list (S155). That is, the access module 180 may determine whether all the frequencies included in the synchronization frequency list Sfreq_list have been used. According to some example embodiments, the preset or set data Data_p may be a design parameter determined through empirical study.

When all the frequencies included in the synchronization frequency list Sfreq_list have not been used, the access module 180 may increase the index i (e.g., increment the index i by '1') and then repeat operations S152 to S154 based on another synchronization frequency (e.g., synchronization frequency Sfreq_list[1]). When all the frequencies included in the synchronization frequency list Sfreq_list have been used, the access module 180 may re-request an accumulation count list Acc_list (e.g., a new accumulation count list Acc_list) (S157) and may search for a new synchronization frequency based on the new accumulation count list Acc_list (for example, operations S110 to S150 in FIG. 6).

When the synchronization data Data_s is identical or similar to the preset or set data Data_p (S154), the access module 180 may perform an operation for obtaining management information. This will be described below with reference to FIG. 15.

Although FIG. 14 illustrates an operation of searching for one synchronization signal, in an embodiment, after finding a first synchronization signal (for example, an NPSS), the access module 180 may perform the operations shown in FIG. 14 twice (e.g., a second time) or more for searching for a second synchronization signal (for example, an NSSS).

Figure 15:
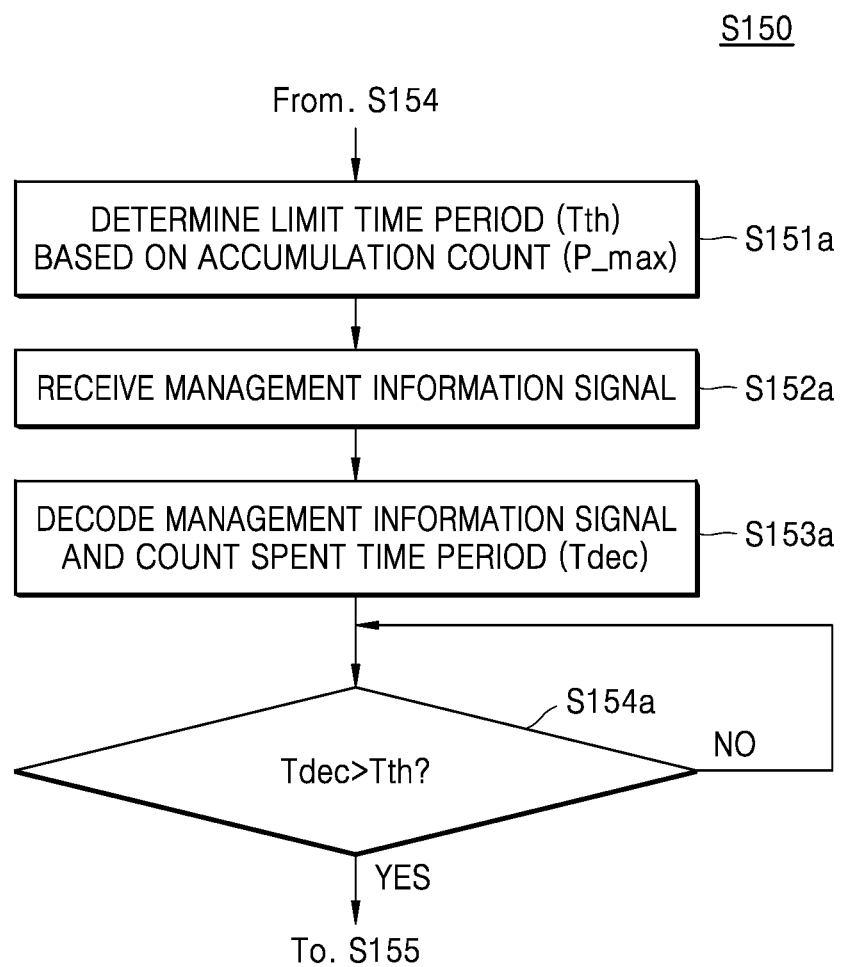
FIG. 15 is a flowchart illustrating a method of operating an access module for obtaining a management information signal, according to an example embodiment of the inventive concepts.

FIG. 15 is a flowchart illustrating a method of operating an access module, according to an example embodiment of the inventive concepts. In particular, FIG. 15 may illustrate a method of obtaining a management information signal in a method of performing initial access (S150) in FIG. 6 and may illustrate operations proceeding from 'Yes' in operation S154 in FIG. 14.

Referring to FIGS. 13 and 15, the access module 180 may determine a limit time period Tth based on the accumulation count P_max (S151a). The access module 180 may receive the management information signal Sig_mi from the base station BS (S152a). The access module 180 may decode the management information signal Sig_mi and count a spent time period Tdec (e.g., the spent time period Tdec may be counted during the decoding of the management information signal Sig_mi) (S153a). The access module 180 may determine whether the spent time period Tdec is greater than the limit time period Tth (S154a). When the spent time period Tdec is not greater than the limit time period Tth, the access module 180 repeats the determination of whether the spent time period Tdec is greater than the limit time period Tth (S154a). According to some example embodiments, the limit time period Tth may be a design parameter determined through empirical study. According to some example embodiments, the limit time period Tth may be determined in operation S151a to be a function of (e.g., a multiple of) and/or proportional to the accumulation count P_max.

When the spent time period Tdec is greater than the limit time period Tth, the access module 180 may stop an initial access operation (e.g., the decoding of the management information signal Sig_mi may be stopped) that is based on the corresponding synchronization frequency (e.g., the frequency for which the synchronization data Data_s is identical or similar to the preset or set data Data_p in operation S154 of FIG. 14) and may perform initial access that is based on another frequency of the synchronization frequency list Sfreq_list (e.g., the access module 180 may reset the synchronization frequency) (S155).

Figure 16:
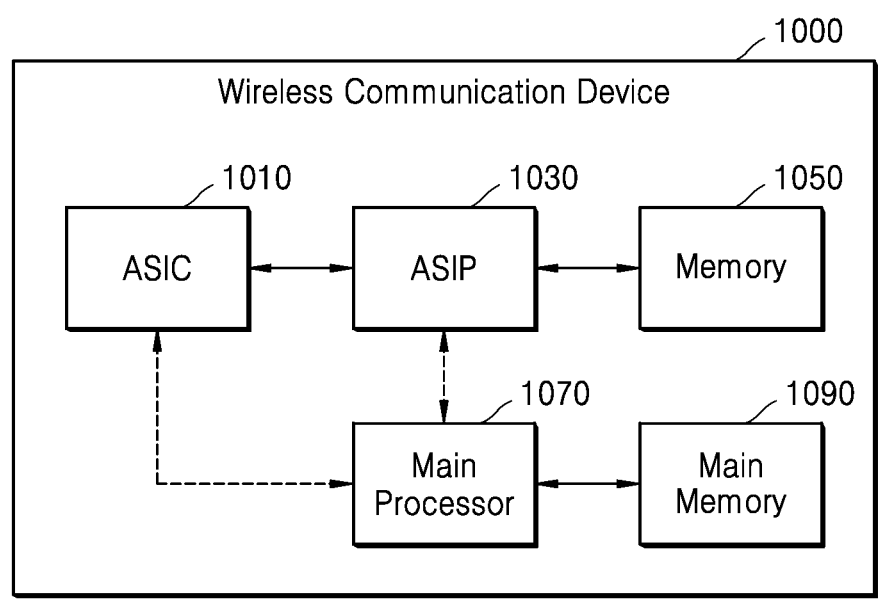
FIG. 16 is a block diagram illustrating a communication device according to an example embodiment of the inventive concepts.

FIG. 16 is a block diagram illustrating a communication device according to an example embodiment of the inventive concepts.

Referring to FIG. 16, a wireless communication device 1000, which is an example of a communication device, may include an application specific integrated circuit (ASIC) 1010, an application specific instruction set processor (ASIP) 1030, memory 1050, a main processor 1070, and/or main memory 1090. Two or more selected from the group of the ASIC 1010, the ASIP 1030, and/or the main processor 1070 may communicate with each other. In addition, at least two selected from the group of the ASIC 1010, the ASIP 1030, the memory 1050, the main processor 1070, and/or the main memory 1090 may be embedded in one chip.

The ASIP 1030, which may be an integrated circuit customized for a specific purpose, may support an instruction set for exclusive use for a specific application and may execute an instruction included in the instruction set. The memory 1050 may communicate with the ASIP 1030 and, as being a non-temporary storage device, may store a plurality of instructions executed by the ASIP 1030, and the memory 1050 may include, for example, any type of memory accessible by the ASIP 1030, such as random access memory (RAM), read only memory (ROM), tape, a magnetic disk, an optical disk, volatile memory, non-volatile memory, and/or a combination thereof. By executing a series of instructions stored in the main memory 1090, the ASIP 1030 and/or the main processor 1070 may detect a synchronization signal from a wireless signal by adaptively adjusting an accumulation count, as described with reference to FIGS. 1 to 15, and may perform cell search based on the detected synchronization signal.

The main processor 1070 may control the wireless communication device 1000 by executing a plurality of instructions. For example, the main processor 1070 may control the ASIC 1010 and/or the ASIP 1030 and may process data received via a wireless communication network and/or may process an input from a user to the wireless communication device 1000. The main memory 1090 may communicate with the main processor 1070 and, as being a non-temporary storage device, may store a plurality of instructions executed by the main processor 1070.

Conventional wireless communication devices performing cell search operations over weak electric field communication systems, such as narrowband IoT (NB-IoT), calculate NPSS and/or NSSS correlations and repeatedly accumulate the correlations according to fixed accumulation counts. By accumulating the correlations according to fixed accumulation counts, the conventional wireless communication devices perform excessive accumulation operations resulting in excessive cell search operation delay.

However, some example embodiments provide an improved wireless communication device that adaptively adjusts an accumulation count, and accumulates the correlations according to the adjusted accumulation count. For example, the improved wireless communication device may search for a synchronization signal during cell search operations using a first accumulation count and, when a synchronization frequency is not found, a second accumulation count (e.g., a higher accumulation count) may be used. Accordingly, the improved wireless communication device prevents or reduces the excessive accumulation operations of the conventional wireless communication devices thereby reducing cell search operation delay.

The various operations of methods described above may be performed by any suitable device capable of performing the operations, such as processing circuitry. For example, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with some example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

While the inventive concepts have been particularly shown and described with reference to embodiments thereof, it will be understood that various changes in form and details may be made therein without departing from the spirit and scope of the following claims.

What is claimed is:

1. A wireless communication device comprising: processing circuitry configured to,
generate each first synchronization signal measurement value among a plurality of first synchronization signal measurement values by combining a different set of first correlation values among a plurality of sets of first correlation values, each of the plurality of first synchronization signal measurement values corresponding to a different frequency among a plurality of frequencies, the plurality of sets of first correlation values being based on a reception signal having the plurality of frequencies, each of the plurality of sets of first correlation values having a number of first correlation values equal to a first accumulation count, and each of the plurality of sets of first correlation values being based on correlations between the reception signal and a pilot signal, determine whether a first valid synchronization signal measurement value is detected among the plurality of first synchronization signal measurement values based on a criterion, determine a frequency among the plurality of frequencies corresponding to the first valid synchronization signal measurement value as a first synchronization frequency in response to determining the first valid synchronization signal measurement value is detected, determine a second accumulation count in response to determining the first valid synchronization signal measurement value is not detected, generate a plurality of second synchronization signal measurement values based on the second accumulation count, and perform an initial access operation for synchronization with a base station using the first synchronization frequency.

2. The wireless communication device of claim 1, wherein the processing circuitry is configured to:

sort at least some of the plurality of first synchronization signal measurement values to generate a plurality of sorted first synchronization signal measurement values;

convert the plurality of sorted first synchronization signal measurement values into a plurality of measurement metrics; and determine whether a valid measurement metric is detected among the plurality of measurement metrics based on the criterion.

3. The wireless communication device of claim 2, wherein the processing circuitry is configured to:

convert the plurality of sorted first synchronization signal measurement values into the plurality of measurement metrics by dividing the plurality of sorted first synchronization signal measurement values by a minimum value among the plurality of sorted first synchronization signal measurement values.

4. The wireless communication device of claim 2, wherein the processing circuitry is configured to:

convert the plurality of sorted first synchronization signal measurement values into the plurality of measurement metrics by dividing the plurality of sorted first synchronization signal measurement values by an average value of the plurality of sorted first synchronization signal measurement values.

5. The wireless communication device of claim 1, wherein the processing circuitry is configured to generate the plurality of second synchronization signal measurement values by combining each set of second correlation values among a plurality of sets of second correlation values, each of the plurality of sets of second correlation values having a number of second correlation values equal to the second accumulation count, the number of second correlation values being higher than the number of first correlation values.

6. The wireless communication device of claim 5, wherein the processing circuitry is configured to determine the first accumulation count and the second accumulation count based on a received accumulation count list.

7. The wireless communication device of claim 1, wherein the processing circuitry is configured to:

extract an extracted reception signal in a set frequency band from the reception signal;

down-sample the extracted reception signal to generate a down-sampled reception signal; and generate the plurality of sets of first correlation values based on the down-sampled reception signal.

8. The wireless communication device of claim 1, wherein the processing circuitry is configured to:

perform the initial access operation by,
receiving a first synchronization signal of a channel corresponding to the first synchronization frequency based on the first accumulation count, and
determining whether there is valid synchronization data in the first synchronization signal.

9. The wireless communication device of claim 8, wherein the processing circuitry is configured to:

combine a plurality of synchronization signals including the first synchronization signal to generate a combined synchronization signal, the plurality of synchronization signals having a number of synchronization signals equal to the first accumulation count; and determine whether synchronization data in the combined synchronization signal is valid based on reference data.

10. The wireless communication device of claim 8, wherein the processing circuitry is configured to:

combine a plurality of synchronization signals including the first synchronization signal to generate a combined synchronization signal, the plurality of synchronization signal having a number of synchronization signals greater than the first accumulation count; and determine whether synchronization data in the combined synchronization signal is valid based on reference data.

11. The wireless communication device of claim 8, wherein the processing circuitry is configured to:

determine the first valid synchronization signal measurement value and a second valid synchronization signal measurement value are detected among the plurality of first synchronization signal measurement values based on the criterion;

determine a second synchronization frequency corresponding to the second valid synchronization signal measurement value;

receive a second synchronization signal of a channel corresponding to the second synchronization frequency based on the first accumulation count; and determine whether there is valid synchronization data in the first synchronization signal and the second synchronization signal.

12. The wireless communication device of claim 8, wherein the processing circuitry is configured to:

receive a management information signal from the base station;

obtain management information by decoding the management information signal for a limit time period, the limit time period being based on the first accumulation count; and perform the initial access operation using a different synchronization frequency from the first synchronization frequency when the limit time period expires.

13. A method of searching for a synchronization signal, the method comprising:

generating each first synchronization signal measurement value among a plurality of first synchronization signal measurement values by combining a different set of first correlation values among a plurality of sets of first correlation values, each of the plurality of first synchronization signal measurement values corresponding to a different frequency among a plurality of frequencies, the plurality of sets of first correlation values being based on N reception signals where N is a natural number, each of the plurality of sets of first correlation values having N first correlation values, each of the plurality of sets of first correlation values corresponding to a different frequency among the plurality of frequencies of the N reception signals, and each of the plurality of sets of first correlation values being based on correlations between the N receptions signal and a pilot signal;

determining whether a first valid synchronization signal measurement value is detected among the plurality of first synchronization signal measurement values based on a criterion;

generating each second synchronization signal measurement value among a plurality of second synchronization signal measurement values by combining a different set of second correlation values among a plurality of sets of second correlation values in response to determining the first valid synchronization signal measurement value is not detected, the plurality of sets of second correlation values being based on M reception signals where M is a natural number different from N, each of the plurality of sets of second correlation values having M first correlation values; and performing synchronization with a base station using a first synchronization frequency among the plurality of frequencies corresponding to the first valid synchronization signal measurement value in response to determining the first valid synchronization signal measurement value is detected.

14. The method of claim 13, wherein
a number of the M reception signals is greater than a number of the N reception signals.

15. The method of claim 13, wherein the determining whether a first valid synchronization signal measurement value is detected comprises:
sorting at least some of the plurality of first synchronization signal measurement values in ascending or descending order to generate a plurality of sorted first synchronization signal measurement values;
converting the plurality of sorted first synchronization signal measurement values into a plurality of measurement metrics; and
determining whether a valid measurement metric is detected among the plurality of measurement metrics based on the criterion.

16. The method of claim 13, further comprising:
receiving an accumulation count list including a plurality of accumulation counts, a number of the N reception signals and a number of the M reception signals both corresponding to the plurality of accumulation counts, wherein,
the generating each first synchronization signal measurement value generates each first synchronization signal measurement value among the plurality of first synchronization signal measurement values based on the accumulation count list, and
the generating each second synchronization signal measurement value generates each second synchronization signal measurement value among the plurality of second synchronization signal measurement values based on the accumulation count list.

17. The method of claim 13, further comprising:
determining whether a second valid synchronization signal measurement value is detected among the plurality of second synchronization signal measurement values based on the criterion;
determining a frequency among the plurality of frequencies corresponding to the second valid synchronization signal measurement value as a second synchronization frequency in response to determining the second valid synchronization signal measurement value is detected; and
performing an initial access operation for synchronization with the base station using the second synchronization frequency.

18. The method of claim 17, wherein the performing an initial access operation comprises:
accumulating a plurality of synchronization signals corresponding to the second synchronization frequency based on a number of the M reception signals to generate an accumulated synchronization signal;
determining whether synchronization data included in the accumulated synchronization signal is valid based on reference data; and
performing synchronization with the base station using a management information signal received from the base station in response to determining the synchronization data is valid.

19. The method of claim 18, further comprising:
receiving the management information signal from the base station;
decoding the management information signal for a limit time period determined based on the number of the M reception signals; and
performing the initial access operation using a different synchronization frequency from the first synchronization frequency when the limit time period expires.

20. A method of searching for a synchronization signal, the method comprising:
generating each synchronization signal measurement value among a plurality of synchronization signal measurement values by combining a different set of correlation values among a plurality of sets of correlation values, each of the plurality of synchronization signal measurement values corresponding to a different frequency among a plurality of frequencies, the plurality of sets of correlation values being based on N reception signals where N is a natural number, each of the plurality of sets of correlation values having N correlation values, each of the plurality of sets of correlation values corresponding to a different frequency among the plurality of frequencies of the N reception signals, and each of the plurality of sets of first correlation values being based on correlations between the N reception signals and a pilot signal;
determining a frequency among the plurality of frequencies corresponding to a valid synchronization signal measurement value among the plurality of synchronization signal measurement values as a synchronization frequency, the valid synchronization signal measurement value being detected among the plurality of synchronization signal measurement values based on a criterion;
accumulating received plurality of synchronization signals corresponding to the synchronization frequency based on a number of the N reception signals to generate an accumulated synchronization signal;

determining whether synchronization data included in the accumulated synchronization signal is valid based on reference data; and performing synchronization with a base station using a management information signal received from the base station in response to determining the synchronization data is valid.

* * * * *